(12) United States Patent  
Yokota et al.

(10) Patent No.: US 7,212,633 B2  
(45) Date of Patent: May 1, 2007

(54) EXPANSION KEY GENERATING DEVICE, ENCRYPTION DEVICE AND ENCRYPTION SYSTEM

(75) Inventors: Kaoru Yokota, Ashiya (JP); Motoji Ohmori, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 726 days.

(21) Appl. No.: 10/400,440

(22) Filed: Mar. 28, 2003

(65) Prior Publication Data

US 2003/0190041 A1    Oct. 9, 2003

(30) Foreign Application Priority Data

Apr. 3, 2002    (JP)    ............... 2002-101074

(51) Int. Cl.  
   *H04L 9/00*    (2006.01)
(52) U.S. Cl. .................. 380/44; 380/44; 380/46; 380/47
(58) Field of Classification Search .......... 380/44, 380/46, 47, 278, 279  
See application file for complete search history.

(56) References Cited

U.S. PATENT DOCUMENTS 5,003,596 A * 3/1991 Wood .................. 380/28

6,304,657 B1   10/2001  Yokota et al.  
2002/0021802 A1   2/2002  Muratani et al.  
2003/0198345 A1 * 10/2003  Van Buer .................. 380/43

FOREIGN PATENT DOCUMENTS

EP    1 081 889    3/2001

* cited by examiner

*Primary Examiner*—Kambiz Zand  
(74) *Attorney, Agent, or Firm*—Wenderoth, Lind & Ponack, L.L.P.

(57) ABSTRACT

An expansion key generating device that receives encryption key data as input, and outputs plural expansion key data, comprising: a data dividing unit operable to divide the encryption key data into plural part key data; and plural key conversion units being connected in series, which output the plural expansion key data. Each of the plural key conversion units includes: an output calculation unit operable to receive the plural part key data or plural output data from a preceding key conversion unit as plural input data, which executes a fixed conversion process for each of the plural input data in so that each bit value of each of the plural input data does not interfere each other, and further outputs plural output data to a subsequent key conversion unit; and an expansion key calculation unit operable to combine plural input data and calculate the expansion key data.

10 Claims, 21 Drawing Sheets

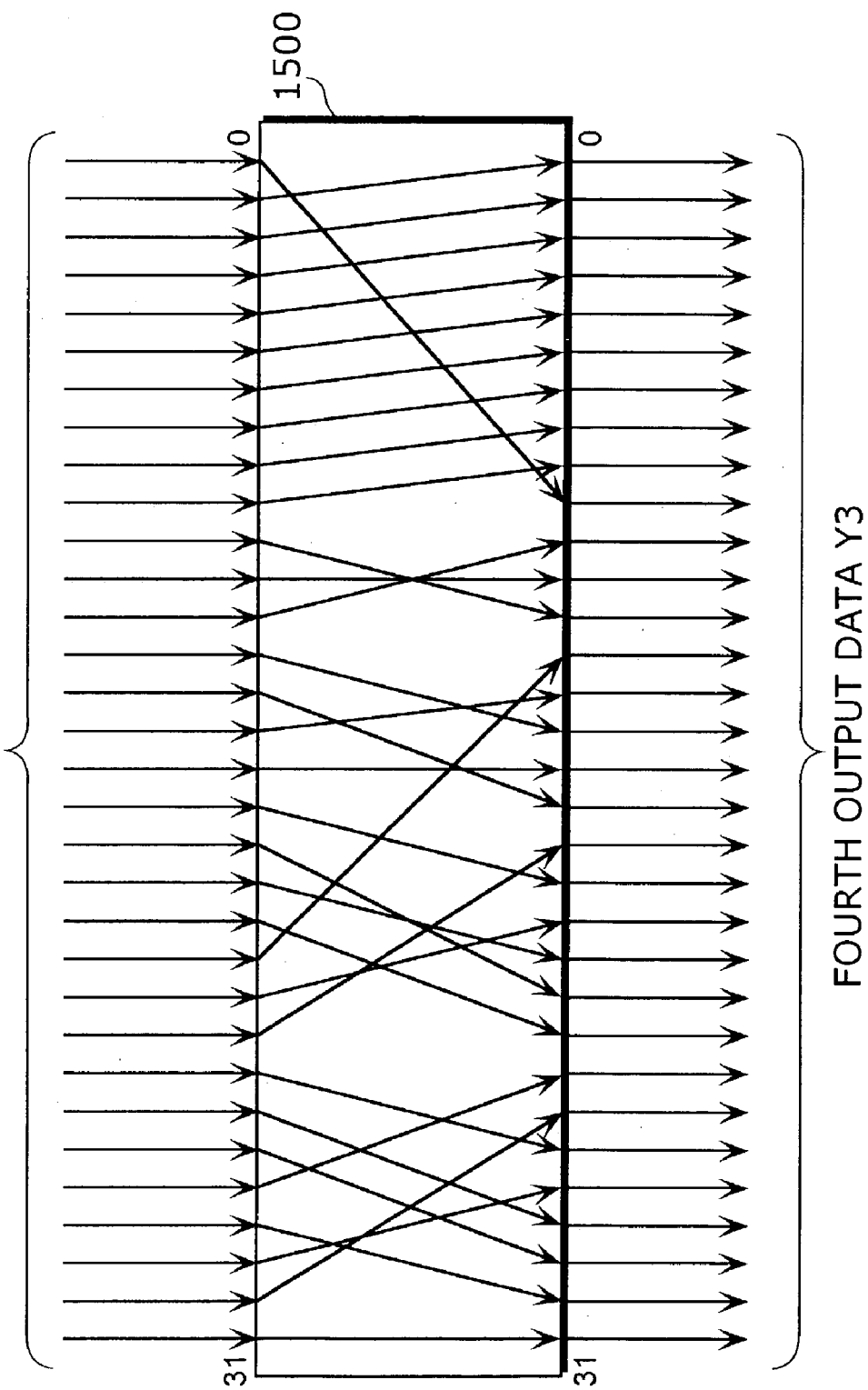

EXPANSION KEY GENERATING DEVICE, ENCRYPTION DEVICE AND ENCRYPTION SYSTEM

BACKGROUND OF THE INVENTION (1) Field of the Invention

The present invention relates to an encryption system. More specifically, the present invention relates to an encryption system which has a decreased difference between encryption time and decryption time, and is capable of generating a highly random expansion key.

(2) Description of the Related Art

Due to a rapid spread of digital communication in recent years, a data encryption method for securing data confidentiality through communication is highly demanded for the purpose of protecting privacy and the development of sound industries. In order to realize an encryption method, a speedy encryption process, and easy implementation, and a high security level are required. In a generic structure of such an encryption method, the data subject for encryption is divided into blocks of a specific size, a data scrambling process is executed to each block based on a specific encryption key, and then a ciphertext is generated.

(First Related Art)

As one of such encryption methods, there is Rijndael encryption which is established as the Advanced Encryption Standard (AES). The AES is the next generation standard of encryption in the United States. FIG. 16 is a diagram showing the internal structure of an encryption device using the Rijndael encryption method. The encryption device 1300 includes an expansion key generating unit 6 that generates and outputs 128-bit expansion keys SK0~SK10 from a 128-bit encryption key EK, and a data scrambling unit 5 that is connected to the expansion key generating unit 6. The data scrambling unit 5 receives the expansion keys SK0~SK10 from the expansion key generating unit 6, executes a data scramble by repeating a specific data conversion process for a plain text PT of 128-bit data using the expansion keys SK0~SK10, and generates a 128-bit ciphertext CT.

The expansion key generating unit 6 includes the following elements: a data dividing unit 600 that receives the encryption key EK, divides the encryption key EK into four 32-bit data blocks D0, D1, D2 and D3, and outputs them; a key conversion unit 60 that is connected to the data dividing unit 600, receives the data blocks D0~D3 from the data dividing unit 600, executes a specific operation, which is explained later, to them, and generates the expansion key SK1 and four 32-bit data blocks, and outputs them; and key conversion units 61~69, each of which is connected to the preceding key conversion unit, receives four 32 bits data blocks from the key conversion unit, executes a specific operation, which is explained later, to them, generates the expansion key and four 32-bit data blocks, and outputs them. The expansion keys output from the key conversion units 61~69 are defined as the expansion keys SK2~SK10 respectively. Although the key conversion unit 69 outputs four data blocks, they are not used for other processes. In addition, the expansion key generating unit 6 outputs the encryption key EK as the expansion key SK0.

The data scrambling unit 5 includes the following elements: a key adding unit 500, which is connected to the expansion key generating unit 6, where the key adding unit 500 receives the expansion key SK0, executes an exclusive-OR operation per bit between a plain text PT and the expansion key SK0, a data conversion unit 50 connected to the key adding unit 500 and the key conversion unit 60 which converts the data output from the key adding unit 500 based on the expansion key SK1; data conversion units 51~58 which are connected to the key conversion units 61~68 respectively, and convert the data output from the preceding data conversion unit based on the expansion keys SK2~SK9 respectively; and a final data conversion unit 59, which is connected to the data conversion unit 58 and the key conversion unit 69, where the final data conversion unit 59 converts the data output from the data conversion unit 58 based on the expansion key SK10, and outputs a ciphertext CT.

FIG. 17 is a diagram showing the internal structure of the key conversion units 60~69. Each of the key conversion units 60~69 executes a key conversion process, which is explained later, based on first~fourth input data X0~X3 of 32 bits each, and outputs first~fourth output data Y0~Y3 and the 128-bit expansion key SK.

Each of the key conversion units 60~69 includes the following elements: a data rotation unit 601 that receives the fourth input data X3, executes a rotation bit shift by 8 bits to the input data X3 in an upper bit direction (a left direction), and outputs its result; a data substituting unit 602 that is connected to the data rotation unit 601, receives the operation result from the data rotation unit 601, executes a specific substituting process to the operation result, and outputs its result; and an exclusive-OR operation unit 603, which is connected to the data substituting unit 602, where the exclusive-OR operation unit 603 receives the substitution result from the data substituting unit 602, executes the exclusive-OR operation per bit between the substitution result and a predefined 32-bit constant Rcon, and outputs data T.

Each of the key conversion units 60~69 further includes the following elements: an exclusive-OR operation unit 604 that is connected to the exclusive-OR operation 603, where the exclusive-OR operation unit 604 receives the first input data X0 and the data T output from the exclusive-OR operation unit 603, executes the exclusive-OR operation per bit between the first input data X0 and the data T, and outputs the first output data Y0; and an exclusive-OR operation unit 605 which is connected to the exclusive-OR operation unit 604, where the exclusive-OR operation unit 605 receives the second input data X1 and the operation result of the exclusive-OR operation unit 604, executes the exclusive-OR operation per bit between the second input data X1 and the operation result, and outputs the second output data Y1.

Each of the key conversion units 60~69 further includes: an exclusive-OR operation unit 606 which is connected to the exclusive-OR operation unit 605, where the exclusive-OR operation unit 606 receives the third input data X2 and the operation result of the exclusive-OR operation unit 605, executes the exclusive-OR operation per bit between the third input data X2 and the operation result, and outputs the third output data Y2; an exclusive-OR operation unit 607 which is connected to the exclusive-OR operation unit 606, where the exclusive-OR operation unit 607 receives the fourth input data X3 and the operation result of the exclusive-OR operation unit 606, executes the exclusive-OR operation per bit between the fourth input data X3 and the operation result, and outputs the fourth output data Y3; and a data concatenation unit 608 which is connected to the exclusive-OR operation units 604~607, where the data concatenation unit 608 concatenates the first~fourth output data Y0~Y3, and outputs the expansion key SK. Details of the process executed in each unit are described in the following explanations of the encryption process.

The following briefly describes the encryption process of the Rijndael encryption method executed by the encryption device 1300. As indicated in FIG. 16, the expansion key generating unit 6 outputs the encryption key EK as the expansion key SK0 to the key adding unit 500 within the data scrambling unit 5. The key adding unit 500 executes the exclusive-OR operation per bit between the plain text PT and the expansion key SK0 and outputs its result to the data conversion unit 50. The data dividing unit 600 divides the encryption key EK by each 32 bits from its upper bit into four data blocks D0, D1, D2 and D3.

Data entered into the data conversion unit 50 is sequentially processed for data conversion in each data conversion unit in the order from the data conversion unit 50 to the data conversion unit 58, and a result finally processed in the final data conversion unit 59 is output as the ciphertext CT.

Each of the data conversion units 50~58 executes the data conversion process based on the expansion keys SK1~SK9. Also, the final data conversion unit 59 executes the data conversion process based on the expansion key SK10. Each of the expansion keys SK1~SK10 is generated in each of the key conversion units 60~69 within the expansion key generating unit 6, and respectively provided to the data conversion units 50~58 and the final data conversion unit 59 in the data scrambling unit 5. That is to say, there is a processing group at each stage, which consists of following processes (1) and (2) as a pair, and the data scrambling unit 5 executes 10 stages of them and generates the ciphertext CT.

Each of the key conversion units 60~69 receives the first~fourth input data X0~X3 (32 bits each), executes the key conversion process, and outputs the expansion key SK (128 bits) and the first~fourth output data Y0~Y3. The data rotation unit 601, the data substituting unit 602 and the exclusive-OR operation unit 603 calculate the data T by conducting the operation expressed as the following formula (1) to the fourth input data X3.

$$T = Rcon(+)Perm(ROTL8(X3)) \quad (1)$$

Here, ROTL8 (X) indicates a result of the rotation bit shift by 8 bits executed to the data X in the upper bit direction (the left direction). Perm (X) indicates a result of a specific substituting process executed to the data X. An operator "(+)" indicates the exclusive-OR operation per bit. The constant Rcon is 32-bit fixed value data which is different in each key conversion units 60~69.

Each of the exclusive-OR operation units 604~607 executes the operation indicated in the following formulas (2)~(5) using the data T resulted from above, and finds the respective first~fourth output data Y0~Y3.

$$Y0 = T(+)X0 \quad (2)$$

$$Y1 = Y0(+)X1 \quad (3)$$

$$Y2 = Y1(+)X2 \quad (4)$$

$$Y3 = Y2(+)X3 \quad (5)$$

The data concatenation unit 608 gets the expansion key SK containing a relation expressed in the following formula (6). The operator "||" indicates data concatenation. That is to say, the below formula (6) shows the 128-bit expansion key SK can be found by concatenating the first~fourth output data Y0~Y3 having 32 bits each.

$$SK = Y0||Y1||Y2||Y3 \quad (6)$$

Each of the key conversion units 60~69 outputs the expansion key SK and the first~fourth output data Y0~Y3 obtained as a result of the above process.

FIG. 18 is a diagram to show the internal structure of the decryption device using the Rijndael encryption method. A decryption device 1400 includes the following elements: an expansion key inverse generating unit 8 that generates the expansion keys SK10~SK0 of 128 bits each in a reverse order of encryption, which is from the 128-bit encryption key EK; and a data inverse scrambling unit 7 that is connected to the expansion key inverse generating unit 8, receives the expansion keys SK10~SK0 from the expansion key inverse generating unit 8, executes a specific inverse data scrambling process to the 128-bit ciphertext using the expansion keys SK10~SK0, and outputs the decryption text DT.

The expansion key inverse generating unit 8 includes the following elements: a data dividing unit 800 which receives the encryption key EK and divides it by each 32 bits from its upper level into four data blocks; a key conversion unit 80 which is connected to the data dividing unit 800, where the key conversion unit 80 receives the four blocks, executes a specific operation to them and outputs four 32-bit data blocks; key conversion units 81~88, each of which is connected to the preceding key conversion unit, where each key conversion unit 81~88 receives four 32-bit data blocks from the preceding key conversion unit, executes a specific operation to them, generates and outputs four 32-bit data blocks to the next key conversion unit; and a key conversion unit 89 which is connected to the key conversion unit 88, where the key conversion unit 89 receives four 32-bit data blocks from the key conversion unit 88, executes a specific operation to the four 32-bit data blocks, and generates and outputs the expansion key SK10 and four 32-bit data blocks.

Since the specific operation executed by the key conversion units 80~89 is the same as the specific operation executed by the key conversion units 60~69 respectively, each of the key conversion units 80~89 has the same structure as the key conversion unit indicated in FIG. 17. Therefore, they are not explained here in detail.

However, the key conversion units 80~88 do not output the expansion keys SK1~SK9, which are different from the key conversion units 60~68. Because of this, each of the key conversion units 80~88 may have the structure of the key conversion unit shown in FIG. 17 where the data concatenation unit 608 is excluded.

The expansion key inverse generating unit 8 further includes the following elements: a key inverse conversion unit 90 which is connected to the key conversion unit 89, where the key conversion unit 90 receives four 32-bit data blocks output from the key conversion unit 89, executes a key inverse conversion process, which is explained later, generates and outputs the expansion key SK9 and four 32-bit data blocks, and key inverse conversion units 91~99, each of which is connected to the key inverse conversion unit, where each of the inverse conversion units 91~99 receives four 32-bit data blocks from the preceding key inverse conversion unit, executes the key inverse conversion process, which is explained later, generates and outputs the expansion key and four 32-bit data blocks.

Each of the expansion keys output from the key inverse conversion units 90~99 are the respective expansion keys SK9~SK0. The key inverse conversion unit 99 outputs four data blocks, but they are not used for other processes.

The data inverse scrambling unit 7 includes the following elements: a final data inverse conversion unit 70 which is connected to the key conversion unit 89, where the final data inverse conversion unit 70 receives the expansion key SK10 from the key conversion unit 89, executes an inverse conversion process of the conversion process executed by the final data conversion unit 59 using the ciphertext CT and the expansion key SK10, and outputs the process result; and a data inverse conversion unit 71 which is connected to the final data inverse conversion unit 70 and the key inverse conversion unit 90, where the data inverse conversion unit 71 respectively receives the process result and the expansion key SK9 from the final data inverse conversion unit 70 and the key inverse conversion unit 90, executes the inverse conversion process of the conversion process executed by the data conversion unit 58, and outputs the process result.

The data inverse scrambling unit 7 further includes the following elements: data inverse conversion units 72~79, each of which is connected to the preceding data inverse conversion unit respectively and also connected the key inverse conversion units 91~98 respectively, where each of the date inverse conversion units 72~79 receives the expansion keys SK8~SK1 respectively from the key inverse conversion units 91~98, executes respectively the inverse conversion process of the conversion process executed by the data conversion units 57~50, and outputs the process result; and a key adding unit 700 which is connected to the data inverse conversion unit 79 and the key inverse conversion unit 99, where the key adding unit 700 receives the process result and the expansion key SK0 respectively from the data inverse conversion unit 79 and the key inverse conversion unit 99, executes the inverse conversion process of the conversion process executed in the key adding unit 500, and outputs the decryption text DT.

FIG. 19 is a diagram to show each internal structure of the key inverse conversion units 90~99. Each of the key inverse conversion units 90~99 executes the key inverse conversion process, which is equivalent to the inverse conversion of the key conversion process executed respectively in each of the key conversion units 60~69 and 80~89 based on the first~fourth input data Y0~Y3, which is 32 bits each, and outputs the first~fourth output data Z0~Z3 and the 128-bit expansion key SK.

Each of the key inverse conversion units 90~99 includes following units: an exclusive-OR operation unit 901 that executes the exclusive-OR operation per bit between the third input data Y2 and the fourth input data Y3, and outputs the fourth output data Z3; an exclusive-OR operation unit 902 that executes the exclusive-OR operation per bit between the second input data Y1 and the third input data Y2, and outputs the third output data Z2; and an exclusive-OR operation unit 903 that executes the exclusive-OR operation per bit between the first input data Y0 and the second input data Y1, and outputs the second output data Z1.

Each of the key inverse conversion units 90~99 further includes the following elements: a data rotation unit 905 which is connected to the exclusive-OR operation unit 901, receives an output of the exclusive-OR operation unit 901, where each of the key inverse conversion units 90~94 executes the rotation bit shift by 8 bits to the output in the upper bit direction (the left direction), and outputs the result; and a data substituting unit 906 which is connected to the data rotation unit 905, where the data rotation unit 905 receives the operation result from the data rotation unit 905, executes a specific substituting process to the operation result, and outputs the result.

Each of the key inverse conversion units 90~99 further includes the following elements: an exclusive-OR operation unit 907 that is connected to the data substituting unit 906, where the exclusive-OR operation unit 907 receives the substituting result from the data substituting unit 906, executes the exclusive-OR operation per bit between the substituting result and a 32-bit constant Rcon predefined in each of the key inverse conversion units 90~99, and outputs data T; an exclusive-OR operation unit 904 which is connected to the exclusive-OR operation unit 907, where the exclusive-OR operation unit 904 receives the data T from the exclusive-OR operation unit 907, executes the exclusive-OR operation per bit between the first input data Y0 and the data T, and outputs the first output data Z0; and a data concatenation unit 908 which is connected to the exclusive-OR operation units 904~901, where the data concatenation unit 909 concatenates the first~fourth output data Z0~Z3, and outputs the expansion key SK. Details of the process taken in each unit are described in the following explanation of a decryption process.

The following briefly describes the decryption process of the Rijndael encryption method executed by the decryption device 1400. As shown in FIG. 18, the data dividing unit 800 divides the 128-bit encryption key EK by each 32 bits from its upper bit into four 32-bit data blocks. A key conversion process is sequentially executed based on these four data blocks in the key conversion units 80~89. As mentioned above, the key conversion process executed in the key conversion units 80~89 is the same as the key conversion process done in the key conversion units 60~69 indicated in FIG. 16. However, the expansion keys SK1~SK9 respectively generated in the key conversion units 80~88 are not used for any subsequent processes.

A key conversion unit 89 outputs the generated expansion key SK to the final data inverse conversion unit 70 as the expansion key SK10. Subsequently, each of the key inverse conversion units 90~99 generates the respective expansion keys SK9~SK0 in order. In parallel with the processes executed in the key conversion unit 89 and the key inverse conversion units 90~99, the final data inverse conversion unit 70, the data inverse conversion units 71~79 and key adding unit 700 execute a specific process respectively based on the expansion keys SK10~SK0. The key adding unit 700 finally generates the decryption text DT, and outputs it.

Next, the following describes details of a process executed in the data inverse scrambling unit 7. The process done in the data inverse scrambling unit 7 is equivalent to inverse conversion of the process taken place in the data scrambling unit 5 of the encryption device 1300 indicated in FIG. 16. Initially, the final data inverse conversion unit 70 executes the inverse conversion process of the process carried out by the final data conversion unit 59 with the expansion key SK10. Subsequently, the data inverse conversion units 71~79 respectively conduct the inverse conversion process of the process in the data conversion units 58~50 using the respective expansion keys SK9~SK1. Lastly, the key adding unit 700 executes the inverse conversion process of the process executed in the key adding unit 500 using the expansion key SK0 and generates the decryption text DT, and outputs it. As mentioned above, at the time of decryption, it is necessary to generate the expansion key in a reverse order of the encryption processes.

The following describes the key inverse conversion process executed in each of the key inverse conversion units 90~99 indicated in FIG. 19.

Each of the exclusive-OR operation units 901~903 finds the respective second~fourth output data Z1~Z3 by executing each operation shown in the following formulas (7)~(9).

$$Z1 = Y0 (+) Y1 \qquad (7)$$

$$Z2 = Y1 (+) Y2 \qquad (8)$$

$$Z3 = Y2 (+) Y3 \qquad (9)$$

The data rotation unit 905, the data substituting unit 906 and the exclusive-OR operation unit 907 calculate the data T by executing the operation indicated in the following formula (10) for the fourth output data Z3.

$$T = Rcon(+)Perm(ROTL8(Z3)) \quad (10)$$

The exclusive-OR operation unit 904 finds the first output data Z0, which is the exclusive-OR operation per bit between the data T and the first input data Y0 according to the next formula (11).

$$Z0 = T(+)Y0 \quad (11)$$

The data concatenation unit 908 concatenates the first~fourth output data Z0~Z3 according to the next formula (12), and generates the 128-bit expansion key SK.

$$SK = Z0\|Z1\|Z2\|Z3 \quad (12)$$

Each of the key inverse conversion units 90~99 outputs the expansion key SK resulted from the above process and the first~fourth output data Z0~Z3.

As shown in FIG. 17, the data substituting unit 602 executes a non-linear process at the time of encryption according to this method. There is an impact on the expansion key SK and all of the output data from the data processed by the non-linear process via the exclusive-OR operation units 604~607. Therefore, though this method is a simple key conversion process, it can generate a highly random expansion key.

(Second Related Art)

The U.S. standard known as the Data Encryption Standard (DES) is the second related art. FIG. 20 is a diagram showing the structure of the key conversion unit 10 used by an encryption device in the DES method. A key conversion unit 10 includes rotation shift units 101 and 102, a data concatenation unit 103 which is connected to the rotation shift units 101 and 102, and a data degenerating unit 104 which is connected to the data concatenation unit 103.

The following describes actions of the key conversion unit 10. The rotation shift unit 101 executes a rotation bit shift process by a specific number of bits to 28-bit first input data, and generates first rotation shift data. The rotation shift unit 102 executes the rotation bit shift process by a specific number of bits to 28-bit second input data, and generates second rotation shift data. The first rotation shift data and the second rotation shift data are output as first output data and second output data respectively from the key conversion unit 10. On the other hand, the data concatenation unit 103 concatenates the first rotation shift data and the second rotation shift data to make 56-bit data, and outputs the data to the data degenerating unit 104. The data degenerating unit 104 extracts data for 48 bits at a predefined bit location from the input data, and outputs the expansion key.

According to the encryption device in the DES method the same expansion key generation process can be applied to generate the expansion key both at the encryption process and at the decryption process because generating the expansion key is basically realized by a data shift process and a data extraction process. Accordingly, there is no difference between the encryption and the decryption processes regarding the processing workload necessary for generating the expansion key.

The above mentioned inventions as well as other related inventions contain deficiencies. In regards to the encryption method of the first related art, the time required to execute the generating process for the expansion key at the decryption stage is greater than the time required at the encryption stage. These timing differences occur for the following reasons. As shown in FIG. 16, in the data scrambling unit 5 of the encryption device 1300, the encryption key EK is used as is in the key adding unit 500 that executes the first process. Therefore, a process of the data scrambling unit 5 can be executed in parallel with a process of the expansion key generating unit 6.

On the other hand, as indicated in FIG. 18, within the data inverse scrambling unit 7 of the decryption device 1400, the final data inverse conversion unit 70, which executes the process at first, must use the expansion key SK10 provided from the expansion key inverse generating unit 8. In order to get the expansion key SK10, a key conversion process needs to be carried out in the key conversion units 80~89. That is to say, the final data inverse conversion unit 70 can start its process only after the key conversion process is executed 10 times. Therefore, the decryption process takes more time than the time taken for the encryption process because these key conversion processes must take place.

When the above-described time gap is significantly large, the following problems arise. Consider, for example, a communication system where data is exchanged in a real time manner between a receiving device and a sending device. If the encryption device 1300 and the decryption device 1400 explained in the first related art are used in such a communication system, the sending device can encrypt data and send it in a real time manner. However, the receiving device cannot decrypt the encryption message in a real time manner because the decryption takes time. Accordingly, the prior art requires the use of a margin at the receiving device to temporarily store the encrypted data, which increases the cost of the receiving device.

Also, as shown in FIG. 21, where an Electronic Toll Collection (ETC) system 1800 installed to a tollgate of expressways, data communication takes place between a tollgate antenna 1804 and an in-vehicle device 1802 which is attached to an automobile 1801 and authentication is executed between the tollgate antenna 1804 and the in-vehicle device 1802. Because the automobile 1801 normally travels through the gate of the ETC system 1800 without stopping, a high-speed response is required for the ETC system 1800. Therefore, if the conventional encryption device 1300 and decryption device 1400 are used in the ETC system 1800, high-speed hardware will be required.

On the other hand, the problem of the first related art, being "the time required to generate the expansion key at the decryption takes longer than the time at the encryption", is resolved in the second related art. However, the second related art still contains a problem where the expansion key is not sufficiently at random.

In the second related art, data is treated as an expansion key wherein a certain number of bits at a specific position are extracted from the concatenated data after a rotation bit shift is applied. Since a data combining process or a substituting process is not used for a process to generate the expansion key, the expansion key is not adequately random. Regarding the generation process of the expansion key in the second related art, the key cannot maintain a high security level. This is typically called a "weak key". The weak key in the DES method is described, for example, in "Alfred J. Menezes, Paul C. van Oorschot, Scott A. Vanstone, "Handbook of Applied Cryptography", CRC Press, 1997, pp. 256–pp. 259".

SUMMARY OF THE INVENTION

In view of the above problems identified in the prior art, the present invention aims at providing an encryption system that reduces the time gap between encryption time and decryption time.

1. Additionally, the present invention also provides an encryption system that is capable of generating an expansion key with a high level of randomness and security. In order to achieve above objectives, this invention specifies an expansion key generating device which receives encryption key data as an input and it is operable to ouput plural expansion key data comprising: a data dividing unit operable to divide the encryption key data into plural part key data; and plural key conversion units, which are connected in series, operable to receive the plural part key data as input and output the plural expansion key data. Further, each of the plural key conversion units includes: an output calculation unit operable to receive the plural part key data or plural output data from a preceding key conversion unit as plural input data, execute a fixed conversion process to each of the plural input data in a way each bit value of each of the plural input data does not interfere each other, and output plural output data into a subsequent key conversion unit; and an expansion key calculation unit operable to combine the plural input data, and generate the expansion key data.

As mentioned above, because the output calculation unit can be separated from the expansion key calculation unit, and the process at the output calculation unit is a fixed conversion process for each of the input data such that each bit value of each input data does not interfere each other, it is possible to have a processing unit equivalent to what is resulted by executing processes at a specific number of stages in the output calculation unit. Therefore, once data is generated in the above equivalent processing unit at the time of decryption, it is possible to sequentially generate the expansion keys used for decrypting the ciphertext data by sequentially executing the inverse conversion processes of the processes executed by the key conversion unit. Accordingly, there is no need to execute the processes at a specific number of stages in the output calculation unit at the decryption, and thereby the time gap between the encryption and the decryption can be reduced.

Also, the expansion key calculation unit can provide a highly random and secure expansion key, because it combines plural part data when calculating the expansion key data.

For example, the output calculation unit executes a rotation shift operation by a specific number of bits to at least one of the plural input data, and the specific number of bits is not a measure of a number of bits of the input data, which the rotation shift operation is executed to.

Since the number of bits for the rotation shift operation is not made to a measure of the input data which the rotation shift rotation is executed to, it becomes hard to generate the same input data as the original input data even if the plural rotation shifts are executed to the input data. Therefore, a highly random and secure expansion key with a high level of security can be provided.

Also, the expansion key calculation unit executes a substituting process to at least one of the plural input data based on a specific substitution table in a halfway process of combining the plural input data.

The expansion key with a high level of randomness and security can be provided by inserting a non-linear process, such as the substituting process.

The present invention is not limited to an embodiment as such an expansion key generating device, but may also embody an encryption device equipped with such an expansion key generating device, and as a decryption device which decrypts a ciphertext data encrypted by an expansion key generating device. The present invention may also embody an encryption system comprised of an encryption device, a decryption device, and an expansion key generating method or a program having a computer function which operates as an expansion key generating device. Such a program may be widely distributed through a recording medium such as a Compact Disk-Read Only Memory (CD-ROM) or a transmission medium like the Internet.

BRIEF DESCRIPTION OF DRAWINGS

These and the other objects, advantages and features of the invention will become apparent from the following description thereof taken in conjunction with the accompanying drawings which illustrate a specific embodiment of the invention. In the drawings:

FIG. 13 is a diagram describing a bit replacing unit 1500.

DESCRIPTION OF A PREFERRED EMBODIMENT

The following specifically describes an encryption system related to the present invention based on an embodiment with reference to drawings. The encryption system is comprised of an encryption device and a decryption device, which are explained later.

Figure 1:
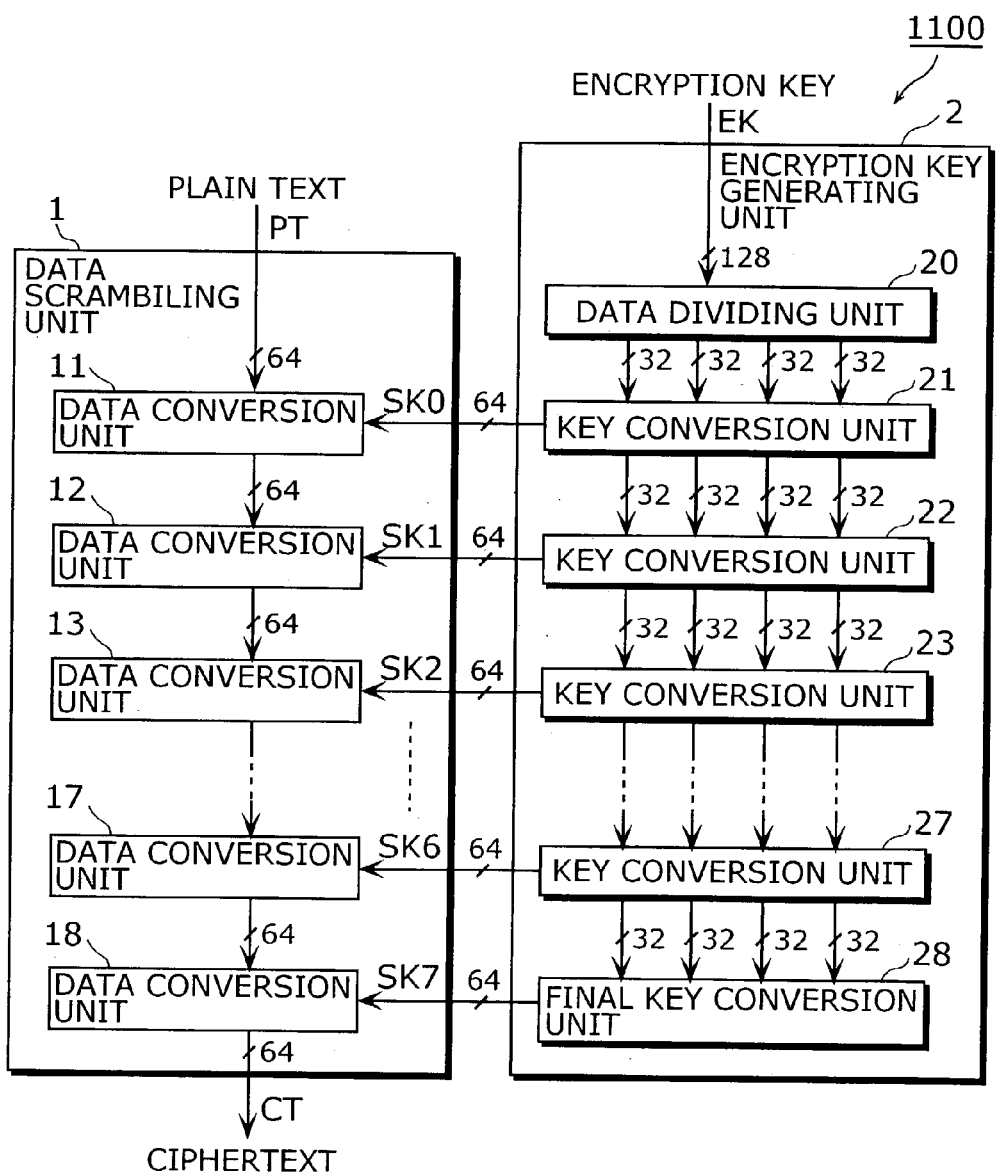
FIG. 1 is a block diagram showing the sample structure of an encryption device 1100 as related to the embodiment of the present invention.

FIG. 1 is a block diagram to show the sample structure of the encryption device related to the embodiment of the present invention.

A data encryption unit 1100 includes the following elements: an expansion key generating unit 2 that generates eight expansion keys SK0~SK7 having 64 bits each based on a 128-bit encryption key EK; and a data scrambling unit 1 that is connected to the expansion key generating unit 2, receives the expansion keys SK0~SK7 from the expansion key generating unit 2, executes a data scramble by repeating a specific data conversion process to a plain text PT by using the expansion keys SK0~SK7, and generates a 64-bit ciphertext CT.

The data scrambling unit 1 consists of eight data conversion units 11~18 that are concatenated vertically. The expansion key generating unit 2 is made up of a data dividing unit 20, seven key conversion units 21~27 and a final key conversion unit 28, which are concatenated vertically.

Figure 2:
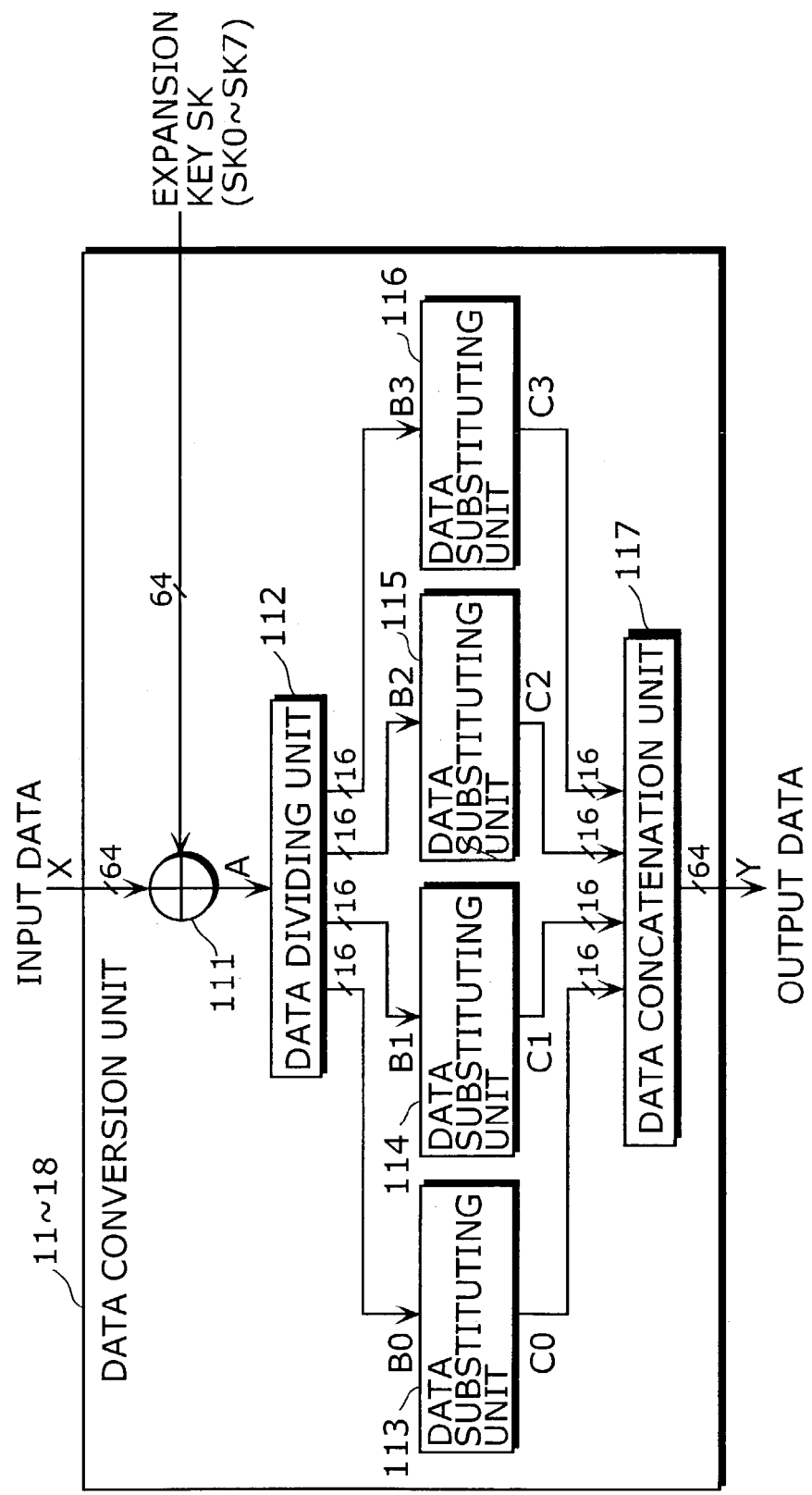
FIG. 2 is a block diagram showing the sample structure of data conversion units 11~18 as related to the embodiment of the present invention.

FIG. 2 is a block diagram to show the internal structure of the data conversion units 11~18. Each of the data conversion units 11~18 includes the following elements: an exclusive-OR operation unit 111 that is connected to either one of the key conversion units 21~27 or the final key conversion unit 28, receives the expansion key SK (one of SK0~SK7) from one of the key conversion units, executes the exclusive-OR operation per bit between the expansion key SK and input data X, and outputs data A; and a data dividing unit 112 that is connected to the exclusive-OR operation unit 111, receives the data A from the exclusive-OR operation unit 111, and divides the data A into four data blocks B0~B3.

Each of the data conversion units 11~18 further includes the following elements: data substituting units 113~116 that are connected to the data dividing unit 112, receive the respective data blocks B0~B3 from the data dividing unit 112, and substitute the respective data blocks C0~C3 for the respective data blocks B0~B3 in a method explained later; and a data concatenation unit 117 that is connected to the data substituting units 113~116, receives the data blocks C0~C3 respectively from the data substituting units 113~116, concatenates the data blocks C0~C3 in a method, which is explained later, and outputs data Y.

Figure 3:
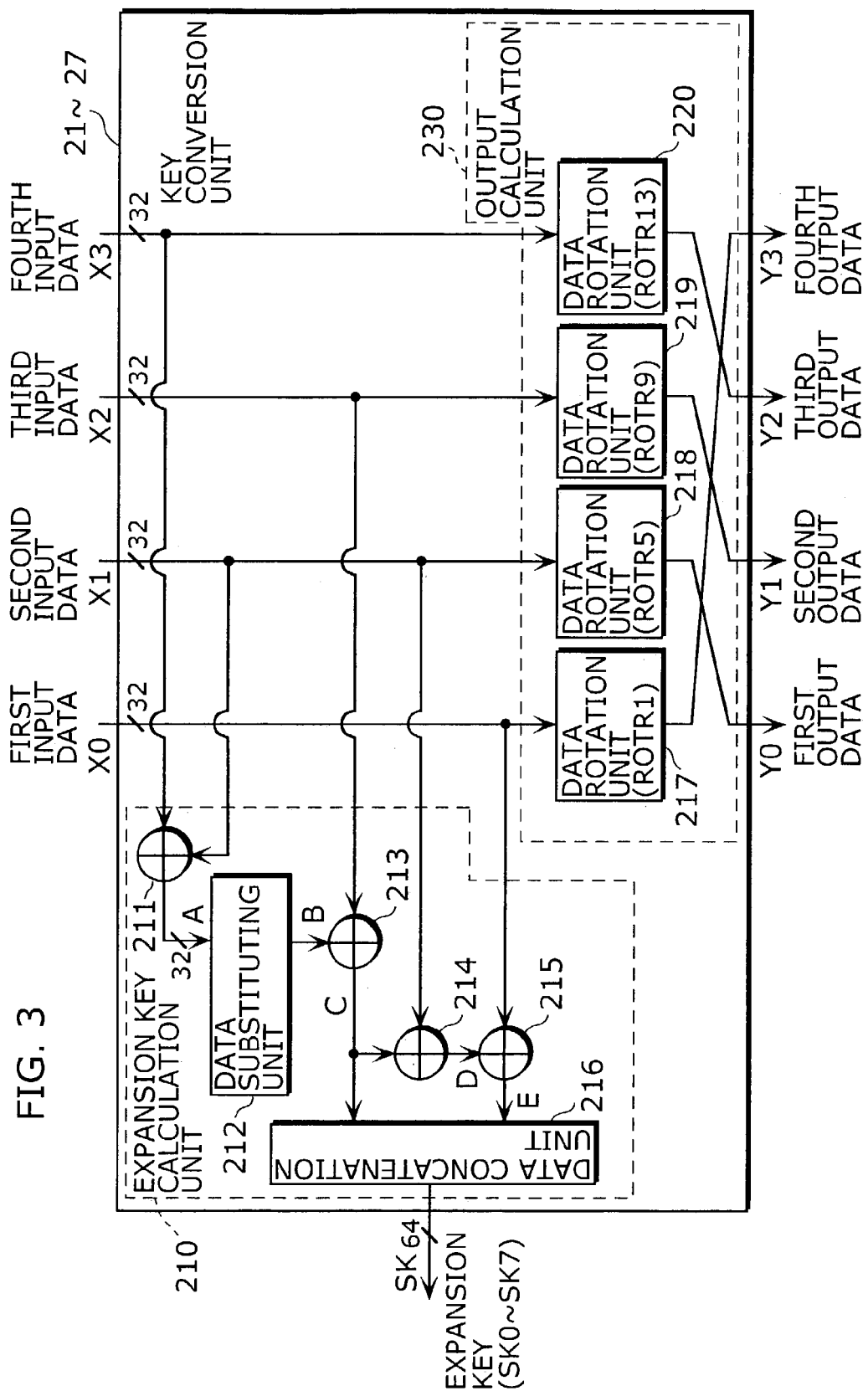
FIG. 3 is a block diagram showing the sample structure of key conversion units 21~27 as related to the embodiment of the present invention.

FIG. 3 is a block diagram showing the internal structure of the key conversion units 21~27. Each of the key conversion units 21~27 includes the following elements: an expansion key calculation unit 210 that receives first~fourth input data X0~X3 having 32 bits each from the data dividing unit 20 or the preceding key conversion unit, and calculates a 64-bit expansion key SK from the first~fourth input data X0~X3; and an output calculation unit 230 that calculates the first~fourth output data Y0~Y3, which are used as input for a subsequent key conversion unit or the final key conversion unit 28, from the first~fourth input data X0~X3.

The expansion key calculation unit 210 includes the following elements: an exclusive-OR operation unit 211 that executes the exclusive-OR operation per bit between the second input data X1 and the fourth input data X3 and calculates 32-bit data A; a data substituting unit 212 that is connected to the exclusive-OR operation unit 211, receives the data A from the exclusive-OR operation unit 211 and substitutes the data B for the data A in a method explained later; and an exclusive-OR operation unit 213 that is connected to the data substituting unit 212, receives the data B from the data substituting unit 212, executes the exclusive-OR operation per bit between the data B and the third input data X2, and calculates data C.

The expansion key calculation unit 210 further includes the following elements: an exclusive-OR operation unit 214 that is connected to the exclusive-OR operation unit 213, which receives the data C from the exclusive-OR operation unit 213, executes the exclusive-OR operation per bit between the data C and the second input data X1, and calculates data D; an exclusive-OR operation unit 215 that is connected to the exclusive-OR operation unit 214, which receives the data D from the exclusive-OR operation unit 214, executes the exclusive-OR operation per bit between the data D and the first input data X0 and calculates data E; and a data concatenation unit 216 that is connected to the exclusive-OR operation units 213 and 215, which receives the data C and the data E respectively from the exclusive-OR operation units 213 and 215, concatenates the data C and the data E, and outputs it as a 64-bit expansion key SK.

An output calculation unit 230 includes the following elements: a data rotation unit 217 that executes a rotation bit shift by 1 bit to the first input data X0 in a lower bit direction (a right direction), and outputs it as the fourth output data Y3; a data rotation unit 218 that executes a rotation bit shift by 5 bits to the second input data X1 in the lower bit direction (the right direction), and outputs it as the first output data Y0; a data rotation unit 219 that executes a rotation bit shift by 9 bits to the third input data X2 in the lower bit direction (the right direction), and outputs it as the second output data Y1; and a data rotation unit 220 that executes a rotation bit shift by 13 bits to the fourth input data X3 in the lower bit direction (the right direction), and outputs it as the third output data Y2.

Figure 4:
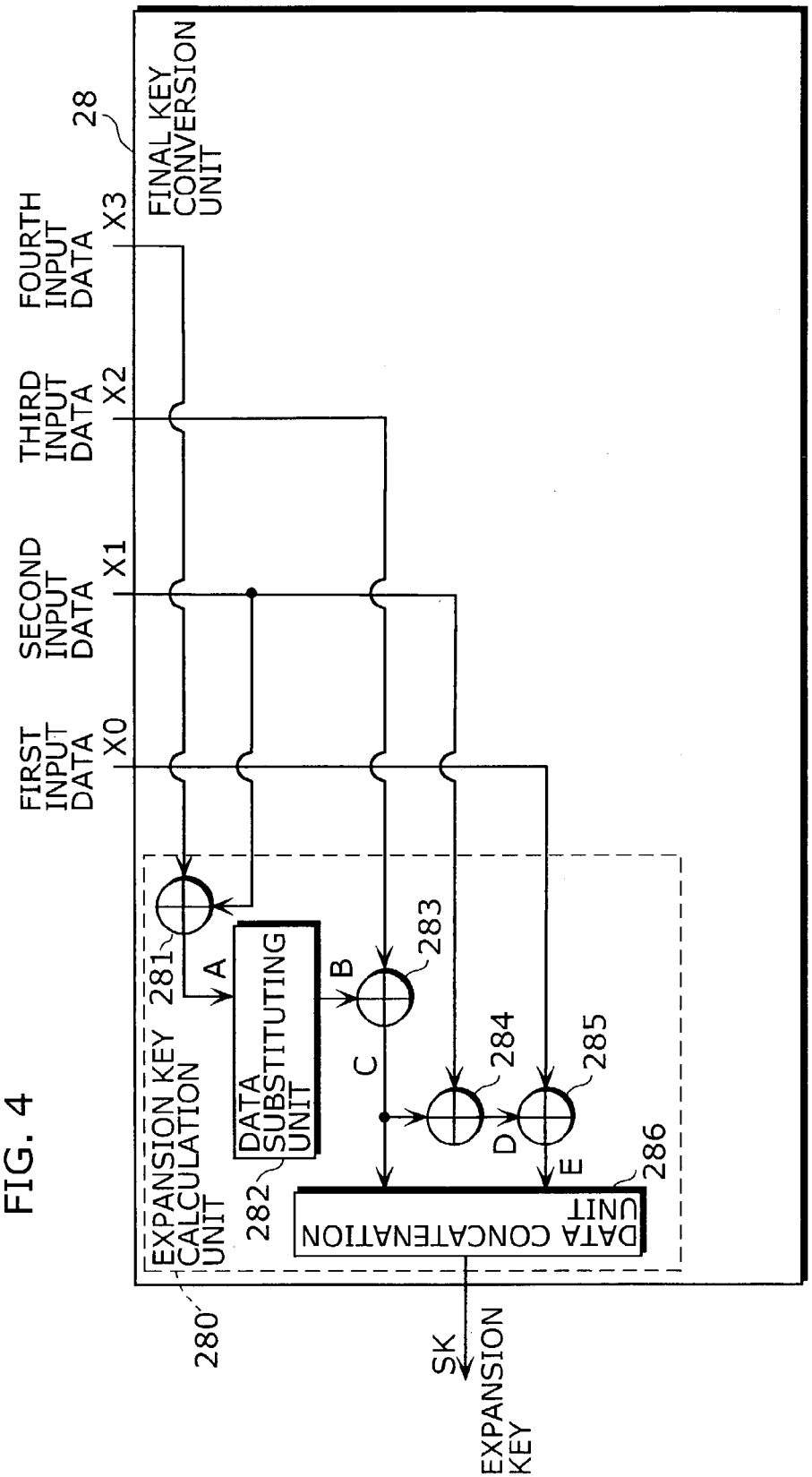
FIG. 4 is a block diagram showing the sample structure of a final key conversion unit 28 as related to the embodiment of the present invention.

FIG. 4 is a block diagram showing the internal structure of the final key conversion unit 28. The final key conversion unit 28 has a configuration of the key conversion unit in FIG. 3 where the output calculation unit 230 is excluded. The final key conversion unit 28 includes the expansion key calculation unit 280.

The expansion key calculation unit 280 includes the following elements: an exclusive-OR operation unit 281; a data substituting unit 282 connected to the exclusive-OR operation unit 281; an exclusive-OR operation unit 283 connected to the data substituting unit 282; an exclusive-OR operation unit 284 connected to the exclusive-OR operation unit 283; an exclusive-OR operation unit 285 connected to the exclusive-OR operation unit 284: and a data concatenation unit 286 connected to the exclusive-OR operation units 283 and 285.

The structures of the exclusive-OR operation units 281, 283~285, the data substituting unit 282 and the data concatenation unit 286 are the same as the respective structures of the exclusive-OR operation units 211, 213~215, the data substituting unit 212 and the data concatenation unit 216 of the expansion key calculation unit 210 in FIG. 3. Therefore, their detailed explanation is omitted here.

The following describes actions taken by the encryption device 1100 with reference to FIG. 1~FIG. 5.

The following explanation is for an overall process flow of the encryption device shown in FIG. 1.

A data dividing unit 20 in the expansion key generating unit 2 divides a 128-bit encryption key EK by each 32 bits from its upper level into four data blocks, and outputs them to the key conversion unit 21. The key conversion unit 21 executes the key conversion process, which is explained later, for the input four blocks, and calculates a 64-bit expansion key SK0 and four 32-bit data blocks. The key conversion unit 21 outputs the expansion key SK0 to the data conversion unit 11 and outputs the calculated four data blocks to a subsequent key conversion unit 22.

The data conversion unit 11 executes the data conversion process, which is explained later, on a 64-bit plain text PT based on the input expansion key SK0, and calculates 64 bit data. The data conversion unit 11 outputs the calculated data to a subsequent data conversion unit 12.

The key conversion unit 22 executes the same key conversion process as the key conversion unit 21 to the four 32-bit data blocks input from the preceding key conversion unit 21, and calculates the expansion key SK1 and the four 32-bit data blocks. The key conversion unit 22 outputs the expansion key SK1 to the data conversion unit 12, and outputs the calculated four data blocks to a subsequent key conversion unit 23.

The data conversion unit 12 executes the same data conversion process as the data conversion unit 11 to the data input from the preceding data conversion unit 11 based on the input expansion key SK1, and calculates 64-bit data. The data conversion unit 12 outputs the calculated data to a subsequent data conversion unit 13.

The same processes are executed in the key conversion units 23~27 and the data conversion units 13~17. The final key conversion unit 28 executes the final key conversion process, which is explained later, to the four data blocks input from the key conversion unit 27, finds the expansion key SK7, and outputs it to the data conversion unit 18.

The data conversion unit 18 executes the same data conversion process as the data conversion unit 11 for the data input from the data conversion unit 17 based on the expansion key SK7, calculates 64-bit ciphertext CT, and outputs it.

The following describes a data conversion process executed by each of the data conversion units 1~18 in FIG. 2. Each of the data conversion units 1~18 executes the data conversion process to the 64-bit input data X based on the 64-bit expansion key SK, and outputs 64-bit output data Y. The input data X is either the plain text PT or the data output from the preceding data conversion unit. The expansion key SK is one of SK0~SK7 respectively output from the key conversion units 21~28.

The exclusive-OR operation unit 111 executes the exclusive-OR operation per bit between the input data X and the expansion key SK, as shown in the following formula (13), and finds the 64-bit data A.

$$A = X(+)SK \quad (13)$$

The data dividing unit 112 receives the data A from the exclusive-OR operation 111, and divides the data A into four data blocks B0, B1, B2 and B3 from its first four bits on the top. That is to say, a relationship indicated in the following formula (14) is established between the data A and the data blocks B0~B3.

$$A = B0\|B1\|B2\|B3 \quad (14)$$

The data dividing unit 112 outputs four data blocks B0~B3 one by one to the data substituting units 113~116.

According to the following formula (15), the data substituting unit 113 finds 16-bit data C0 based on the 16-bit data B0 input from the data dividing unit 112.

$$C0 = Sbox[B0h]\|Sbox[B0l] \quad (15)$$

Figure 5:
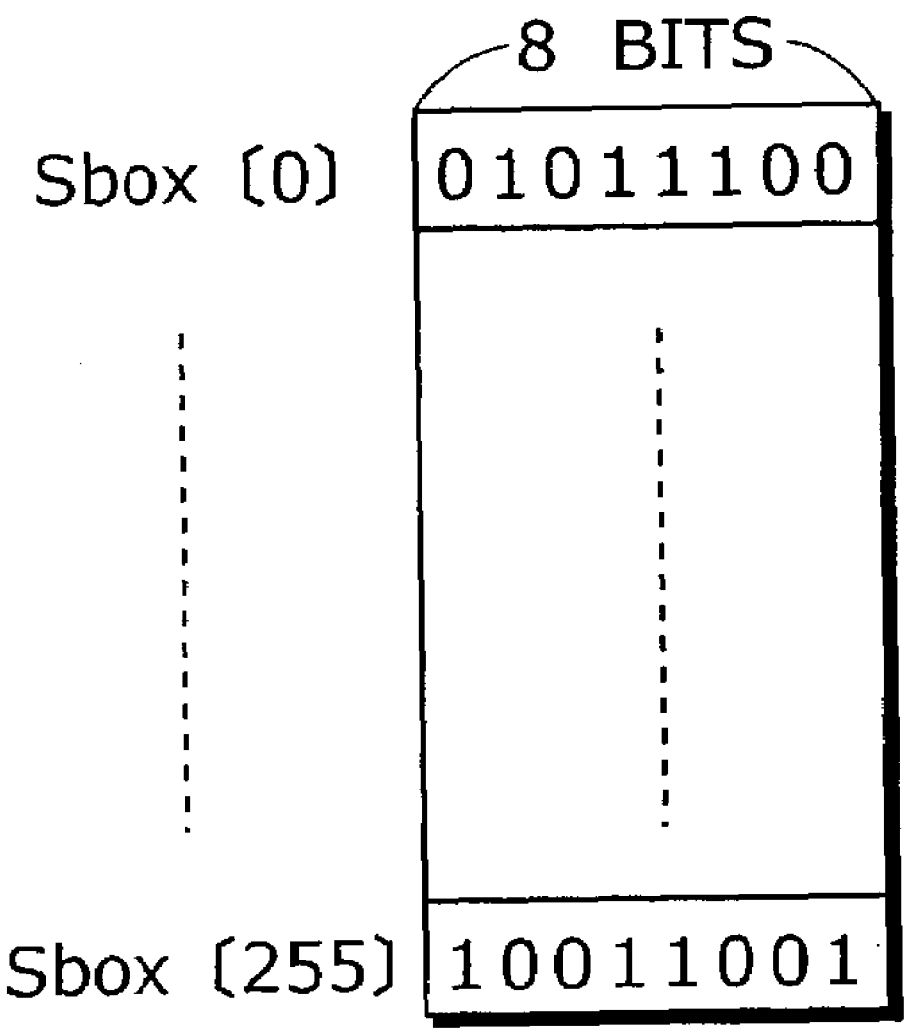
FIG. 5 is a diagram describing a substitution table Sbox.

Sbox here indicates a substitution table. As shown in FIG. 5, the substitution table Sbox is composed of arrays having 256 elements, and each element consists of 8-bit data. B0$h$ indicates 8 bits in an upper level of the data B0, whereas B0$l$ indicates 8 bits in a lower level of the data B0.

That is to say, Sbox [B0$h$] shows the B0$h$-th element in the substitution table Sbox, while Sbox [B0$l$] shows the B0$l$-th element in the substitution table Sbox. Data C0 is data generated by concatenating these two elements.

The substitution table Sbox used here is the one described in "S-box design considering the security against known attacks on block ciphers", Technical Report of IEICE, Vol. 98 No. 48, ISEC98-13, (in Japanese), (July, 1998) written by Shiho Moriai, Kazumaro Aoki, Masayuki Kanda, Youichi Takashima, and Kazuo Ohta. However, the substitution table Sbox is not limited to this, and may be something else.

The data substituting units 114~116 receive the respective data blocks B1~B3 from the data dividing unit 112, find the data blocks C1~C3 respectively, and output them. As a process executed in each of the data substituting units 114~116 is the same as the process executed by the data substituting unit 113, its detailed explanation is not repeated here.

A data concatenation unit 117 receives the data blocks C0~C3 respectively from the data substituting units 113~116, concatenates the data blocks C0~C3 according to the following formula (16), finds 64-bit data Y, and outputs it.

$$Y = C0\|C1\|C2\|C3 \quad (16)$$

The following describes the key conversion process executed in each of the key conversion units 21~27 shown in FIG. 3. Each of the key conversion units 21~27 executes the expansion key calculation process and the output calculation process, which are explained later, to the first~fourth input data X0~X3, calculates the expansion key SK and the first~fourth output data Y0~Y3, and outputs them. The first~fourth input data X0~X3 are four 32-bit data blocks output from the data dividing unit 20 or the preceding key conversion unit. The expansion key SK is one of SK0~SK6 respectively input to the data conversion units 11~17.

The following explains the expansion key calculation process executed in the expansion key calculation unit 210.

The exclusive-OR operation unit 211 executes the exclusive-OR operation per bit between the second input data X1 and the fourth input data X3 according to the following formula (17), and finds 32-bit data A.

$$A = X1(+)X3 \quad (17)$$

A data substituting unit 212 receives the data A from the exclusive-OR operation unit 211, and finds 32-bit data B indicated according to the following formula (18) using the same substitution table Sbox as the substitution table used in the data conversion units 11~18.

$$B = Sbox[A0]\|Sbox[A1]\|Sbox[A2]\|Sbox[A3] \quad (18)$$

Data values, which are obtained by dividing the data A by each 8 bits from its upper level, are respectively treated as A0, A1, A2 and A3.

The exclusive-OR operation unit 213 receives the data B from the data substituting unit 212, executes the exclusive-OR operation per bit between the data B and the third input data X2 according to the following formula (19), and gets 32-bit data C.

$$C=B(+)X2 \qquad (19)$$

The exclusive-OR operation unit 214 receives the data C from the exclusive-OR operation unit 213, and executes the exclusive-OR operation per bit between the data C and the second input data X1 according to the following formula (20), and gets 32-bit data D.

$$D=C(+)X1 \qquad (20)$$

The exclusive-OR operation unit 215 receives the data D from the exclusive-OR operation unit 214, and executes the exclusive-OR operation per bit between the data D and the first input data X0 according to the following formula (21), and gets 32-bit data E.

$$E=D(+)X0 \qquad (21)$$

The data concatenation unit 216 receives the data C and E respectively from the exclusive-OR operation units 213 and 215, concatenates the data C and E according to the following formula (22), and outputs it as a 64-bit expansion key SK.

$$SK=C\|E \qquad (22)$$

The following describes a process (an output calculation process) to calculate the first~fourth output data Y0~Y3 in the output calculation unit 230.

The data rotation units 217~220 calculate the fourth output data Y3, the first output data Y0, the second output data Y1 and the third output data Y2 respectively according to the following formulas (23)~(26).

$$Y3=ROTR1(X0) \qquad (23)$$

$$Y0=ROTR5(X1) \qquad (24)$$

$$Y1=ROTR9(X2) \qquad (25)$$

$$Y2=ROTR13(X3) \qquad (26)$$

ROTR1 (X), ROTR5 (X), ROTR9 (X) and ROTR13 (X) respectively indicate results of the data X where the respective rotation bit shift by 1 bit, 5 bits, 9 bits and 13 bits is applied to in a lower side direction (a right direction).

The following describes the final key conversion process executed by the final key conversion unit 28 in FIG. 4. The expansion key calculation unit 280 of the final key conversion unit 28 calculates the expansion key SK7 by taking the same actions as the expansion key calculation unit 210 in FIG. 3. Therefore, its detailed explanation is not repeated here.

Figure 6:
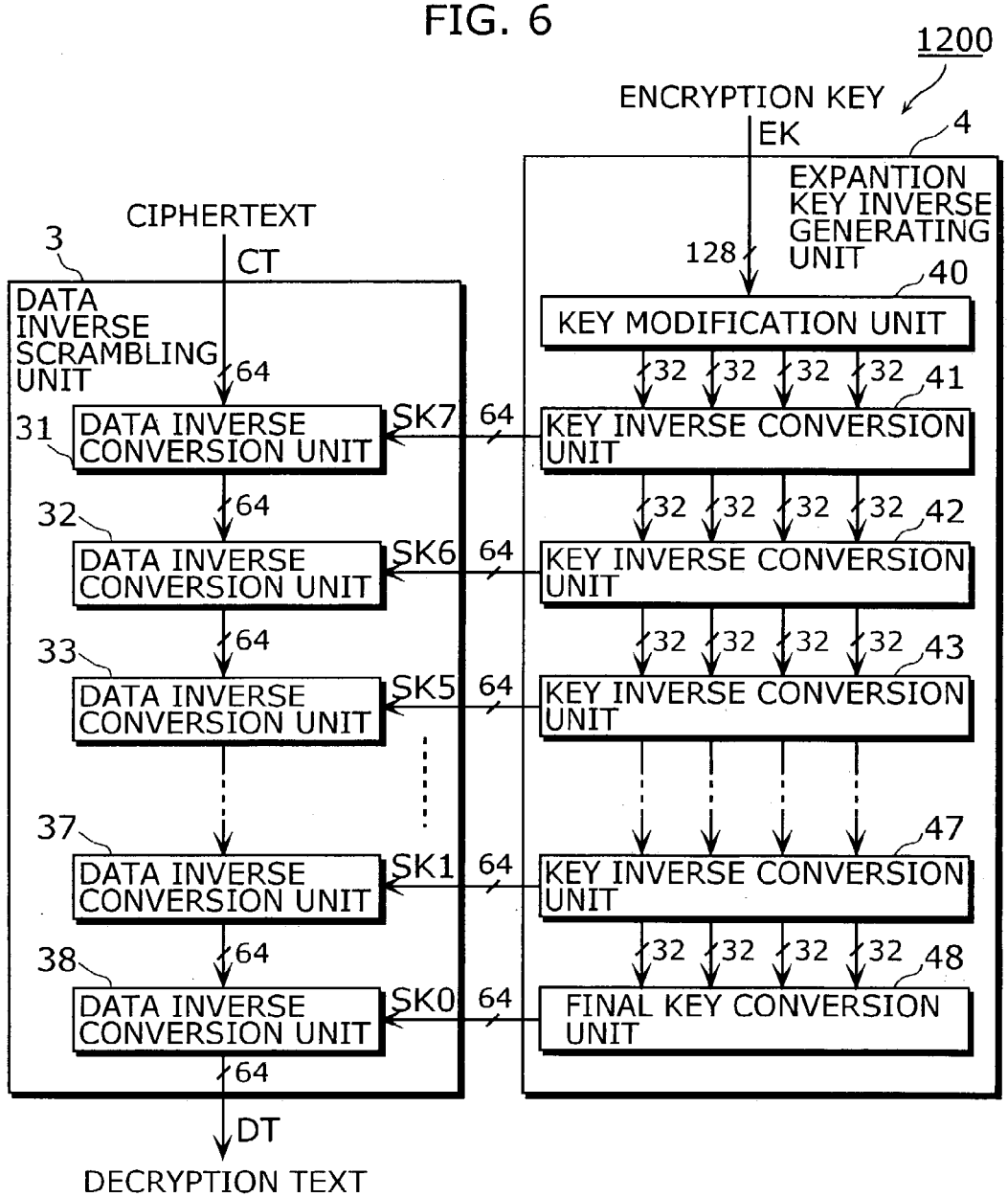
FIG. 6 is a block diagram showing the sample structure of a decryption device 1200 related to the embodiment of the present invention.

FIG. 6 is a block diagram showing the sample structure of the decryption device related to the embodiment of the present invention.

The data decryption device 1200 includes the following elements: an expansion key inverse generating unit 4 that generates eight expansion keys SK7~SK0 of 64 bits each in a reverse order of the encryption based on the 128-bit encryption key EK; and a data inverse scrambling unit 3 that is connected to the expansion key inverse generating unit 4, receives the expansion keys SK7~SK0 from the expansion key inverse generating unit 4, and generates the decryption text DT by repeating the inverse data conversion process, which is explained later, to the ciphertext CT using the expansion keys SK7~SK0.

The data inverse scrambling unit 3 consists of eight data inverse conversion units 31~38 concatenated vertically. The expansion key inverse generating unit 4 is made up of the key modification unit 40, seven key inverse conversion units 41~47 and a final key conversion unit 48 concatenated vertically.

Figure 7:
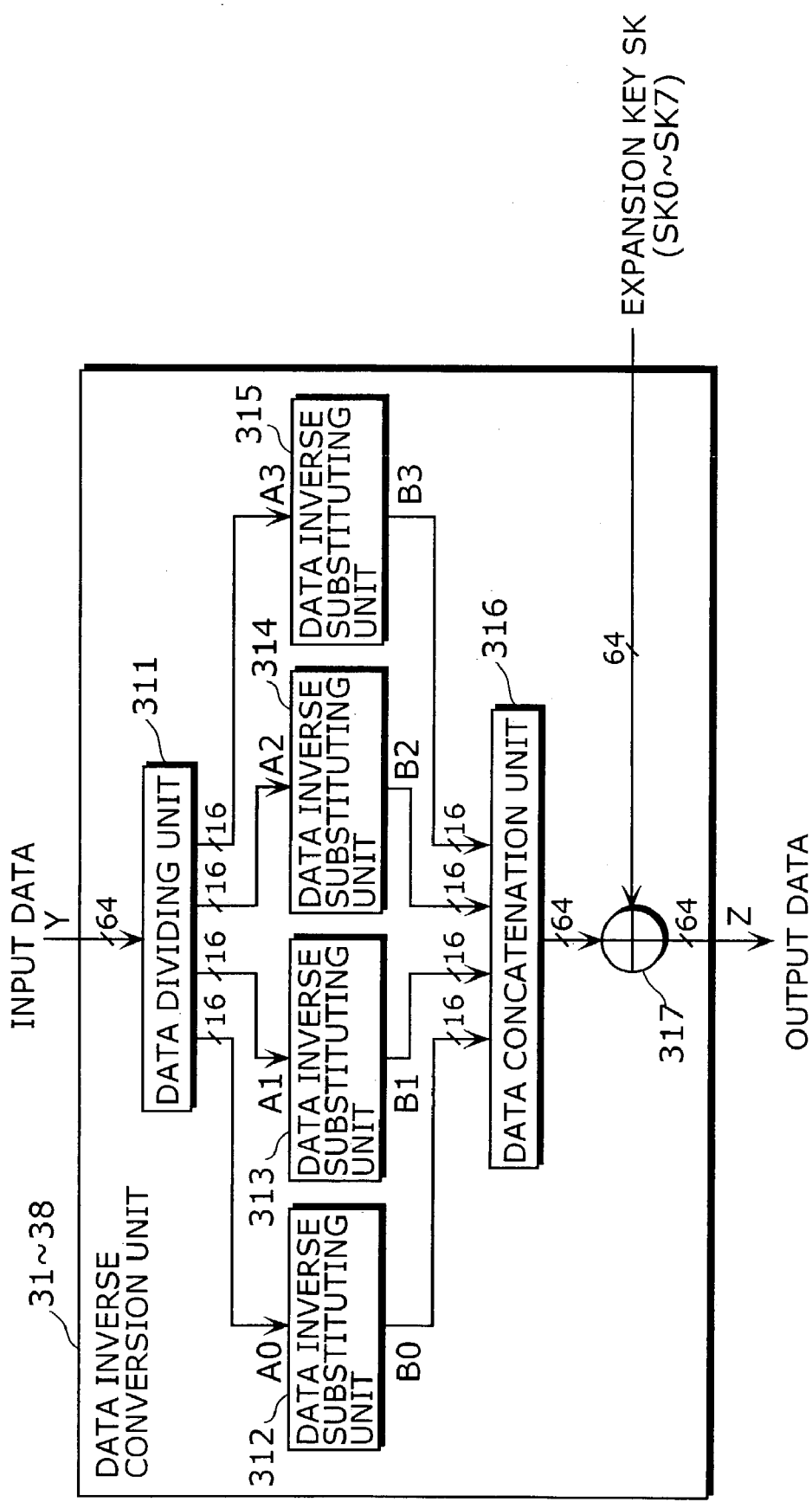
FIG. 7 is a block diagram demonstrating the sample structure of data inverse conversion units 31~38 as related to the embodiment of the present invention.

FIG. 7 is a block diagram of the internal structure of the data inverse conversion units 31~38. Each of the data inverse conversion units 31~38 includes a data dividing unit 311 that receives 64-bit input data Y (the ciphertext CT or the output data of the preceding data inverse conversion unit) and divides the data Y into four data blocks A0~A3, and data inverse substituting units 312~315 that are connected to the data dividing unit 311, receive the respective data blocks A0~A3 from the data dividing unit 311 and substitute the respective data blocks B0~B3 for the respective data blocks A0~A3 in a method, which is explained later.

Each of the data inverse conversion units 31~38 further includes the following elements: a data concatenation unit 316 that is connected to the data inverse substituting units 312~315, receives the data blocks B0~B3 from the data inverse substituting units 312~315, concatenates the data blocks B0~B3, and outputs it; the exclusive-OR operation unit 317 that is connected to the data concatenation unit 316, receives the concatenated result output from the data concatenation unit 316, executes the exclusive-OR operation per bit between the concatenated result and the expansion key SK, and outputs data Z.

Figure 8:
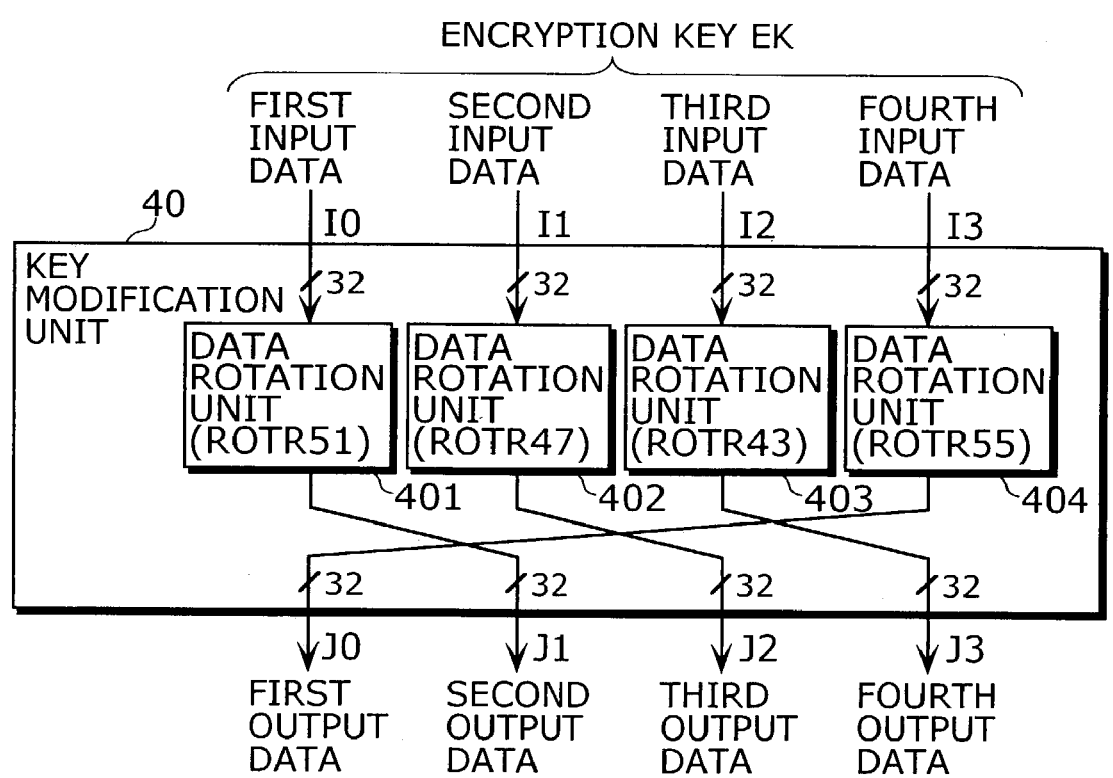
FIG. 8 is a block diagram showing the sample structure of a key modification unit 40 as related to the embodiment of the present invention.

FIG. 8 is a block diagram showing the internal structure of the key modification unit 40. The key modification unit 40 receives the first~fourth input data I0~I3 of 32 bits each, executes a process, which is explained later, and calculates the first~fourth output data J0~J3. The key modification unit 40 includes the following elements: a data rotation unit 401 that executes the rotation bit shift by 51 bits to the first input data I0 in the lower bit direction (the right direction), and outputs it as the second output J1; a data rotation unit 402 that executes the rotation bit shift by 47 bits to the second input data I1 in the lower bit direction (the right direction), and outputs it as the third output data J2; a data rotation unit 403 that executes the rotation bit shift by 43 bits to the third input data I2 in the lower level bit direction (the right direction), and outputs it as the fourth output data J3; a data rotation unit 404 that executes the rotation bit shift by 55 bits to the fourth input data I3 in the lower level bit direction (the right direction), and outputs it as the first output data J0.

Figure 9:
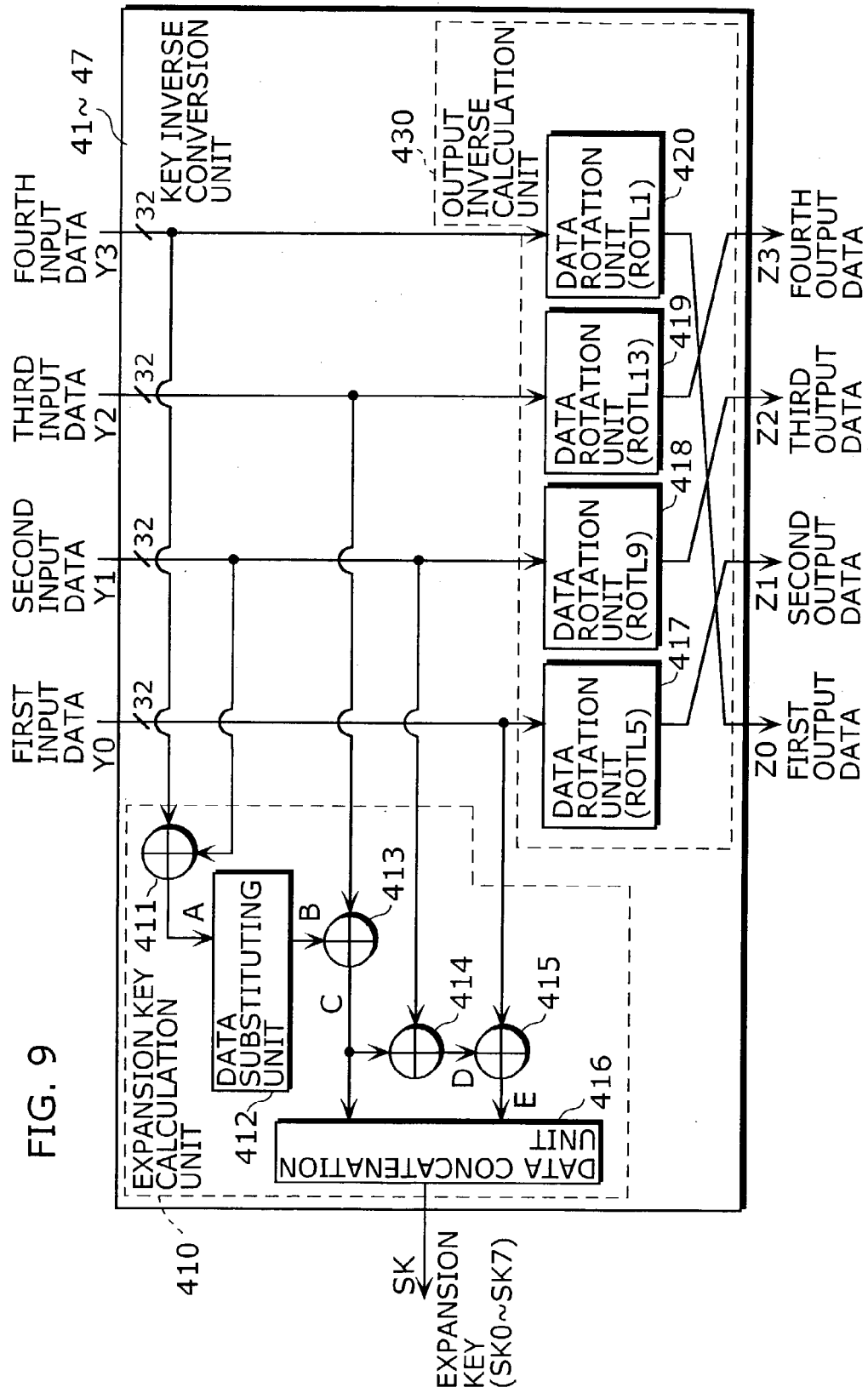
FIG. 9 is a block diagram showing the sample structure of key inverse conversion units 41~47 as related to the embodiment of the present invention.

FIG. 9 is a block diagram to show the internal structure of the key inverse conversion units 41~47. Each of the key inverse conversion units 41~47 includes the following elements: an expansion key calculation unit 410 that receives the first~fourth input data Y0~Y3 having 32 bits each from the key modification unit 40 or the preceding key inverse conversion unit, and calculates 64-bit expansion key SK from the first~fourth input data Y0~Y3; and an output inverse calculation unit 430 that calculates the first~fourth output data Z0~Z3 which is an input to the subsequent key inverse conversion unit or the final key conversion unit 48 from the first~fourth input data Y0~Y3.

The expansion key calculation unit 410 includes the following elements: an exclusive-OR operation unit 411 that executes the exclusive-OR operation per bit between the second input data Y1 and the fourth input data Y3, and calculates 32-bit data A; a data substituting unit 412 that is connected to the exclusive-OR operation unit 411, receives the data A from the exclusive-OR operation unit 411, and substitutes the data B for the data A in a method, which is explained later; an exclusive-OR operation unit 413 that is connected to the data substituting unit 412, receives the data B from the data substituting unit 412, executes the exclusive-OR operation per bit between the data B and the third input data Y2, and calculates data C.

The expansion key calculation unit 410 further includes the following elements: an exclusive-OR operation unit 414 that is connected to the exclusive-OR operation unit 413, receives the data C from the exclusive-OR operation unit 413, executes the exclusive-OR operation per bit between the data C and the second input data Y1, and calculates data D; an exclusive-OR operation unit 415 that is connected to the exclusive-OR operation unit 414, receives the data D from the exclusive-OR operation unit 414, executes the exclusive-OR operation per bit between the data D and the first input data Y0, and calculates data E; and a data concatenation unit 416 that is connected to the exclusive-OR operation units 413 and 415, receives the data C and the data E respectively from the exclusive-OR operation units 413 and 415, concatenates the data C and the data E, and outputs it as a 64-bit expansion key SK.

The output inverse calculation unit 430 includes the following elements: a data rotation unit 417 that executes the rotation bit shift by 5 bits to the first input data Y0 in the upper level direction (the left direction), and outputs it as the second output data Z1; a data rotation unit 418 that executes the rotation bit shift by 9 bits to the second input data Y1 in the upper level direction (the left direction), and outputs it as the third output data Z2; a data rotation unit 419 that executes the rotation bit shift by 13 bits to the third input data Y2 in the upper direction (the left direction), and outputs it as the fourth output data Z3; and a data rotation unit 420 that executes the rotation bit shift by 1 bit to the fourth input data Y3 in the upper direction (the left direction), and outputs it as the first output data Z0.

The final key conversion unit 48 indicated in FIG. 6 has the same structure as the final key conversion unit 28 in FIG. 4. Therefore, its detailed explanation is not repeated here.

The following describes actions taken by the decryption device 1200 with reference to FIG. 6~FIG. 12.

An overall process flow of the decryption device 1200 shown in FIG. 6 is described as follows.

The key modification unit 40 within the expansion key inverse generating unit 4 executes, after internally dividing a 128-bit encryption key EK into four 32-bit data blocks, the key modification process, which is explained later, and calculates four 32-bit data blocks. The key modification unit 40 outputs the calculated four data blocks to the key inverse conversion unit 41.

The key inverse conversion unit 41 executes the key inverse conversion process, which is explained later, based on the input four data blocks, and calculates a 64-bit expansion key SK7 and four 32-bit data blocks. The key inverse conversion unit 41 outputs the expansion key SK7 to the data inverse conversion unit 31, and outputs the four data blocks to the next key inverse conversion unit 42.

The data inverse conversion unit 31 executes the inverse data conversion process, which is explained later, to a 64-bit ciphertext CT based on the input expansion key SK7, calculates 64-bit data, and outputs it to the next data inverse conversion unit 32.

The key inverse conversion unit 42 executes the same process as the key inverse conversion unit 41 based on the four data blocks input from the preceding key inverse conversion unit 41, and calculates the expansion key SK6 and four data blocks. The key inverse conversion unit 42 outputs the expansion key SK6 to the data inverse conversion unit 32, and outputs the calculated four data blocks to the key inverse conversion unit 43.

The data inverse conversion unit 32 executes the same inverse data conversion process as the data inverse conversion unit 31 to the data input from the preceding data inverse conversion unit 31 based on the expansion key SK6, calculates 64-bit data, and outputs it to the subsequent data inverse conversion unit 33.

The same operation is executed in the key inverse conversion units 43~47 and the data inverse conversion units 33~37. The final key conversion unit 48 executes the same process as the final key conversion process used in the final key conversion unit 28 in FIG. 4 from the four data blocks input from the key inverse conversion unit 47, calculates the expansion key SK0, and outputs it to the data inverse conversion unit 38.

The data inverse conversion unit 38 executes the same inverse data conversion process as the data inverse conversion unit 31 to the data input from the data inverse conversion unit 37 based on the expansion key SK0, calculates and outputs a 64-bit decryption text DT.

The following describes the inverse data conversion process executed in each of the data inverse conversion units 31~38 indicated in FIG. 7.

The data dividing unit 311 divides the 64-bit data Y (the ciphertext CT or the data Z output from the preceding data inverse conversion unit) by each 16 bits from its upper level into four data blocks A0, A1, A2 and A3. That is to say, the relationship indicated in the following formula (27) is established between the data Y and the data blocks A0~A3.

$$Y = A0 \| A1 \| A2 \| A3 \tag{27}$$

The data dividing unit 311 outputs the data blocks A0~A3 to the data inverse substituting units 312~315 respectively.

The data inverse substituting unit 312 finds 16-bit data block B0 according to the following formula (28) based on the 16-bit data A0 input from the data dividing unit 311.

$$B0 = InvSbox[A0h] \| InvSbox[A0l] \tag{28}$$

Figure 10:
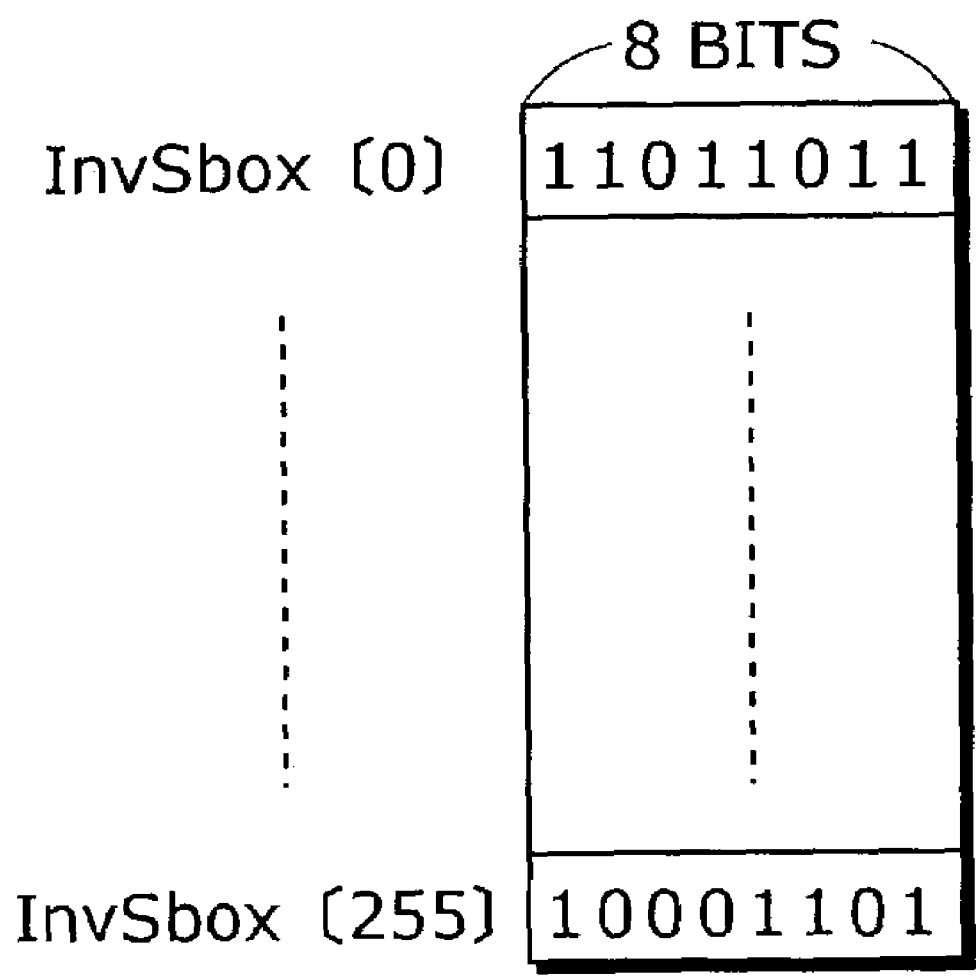
FIG. 10 is a diagram describing an inverse substitution table InvSbox.

InvSbox here indicates an inverse substitution table that executes an inverse substitution of the substitution table Sbox explained above. The inverse substitution table consists of arrays having 256 elements as shown in FIG. 10, and each element has 8-bit data. A0$h$ indicates the first 8 bits of the data block A0, whereas A0$l$ shows the last 8 bits of the data block A0.

That is to say, InvSbox [A0$h$] shows the A0$h$-th element in the inverse substitution table InvSbox, while InvSbox [A0$l$] indicates the A0$l$-th element in the inverse substitution table InvSbox. The data block B0 is the data generated by concatenating these two elements.

The inverse substitution table InvSbox used here is the one created based on the substitution table Sbox used by the data substituting units 113~116 in FIG. 2 at the time of encryption.

In short, the relationship indicated in the following formula (29) is established between the substitution table Sbox and the inverse substitution table InvSbox.

$$InvSbox[Sbox[I]] = i (i = 0 \sim 255) \tag{29}$$

Figure 11:
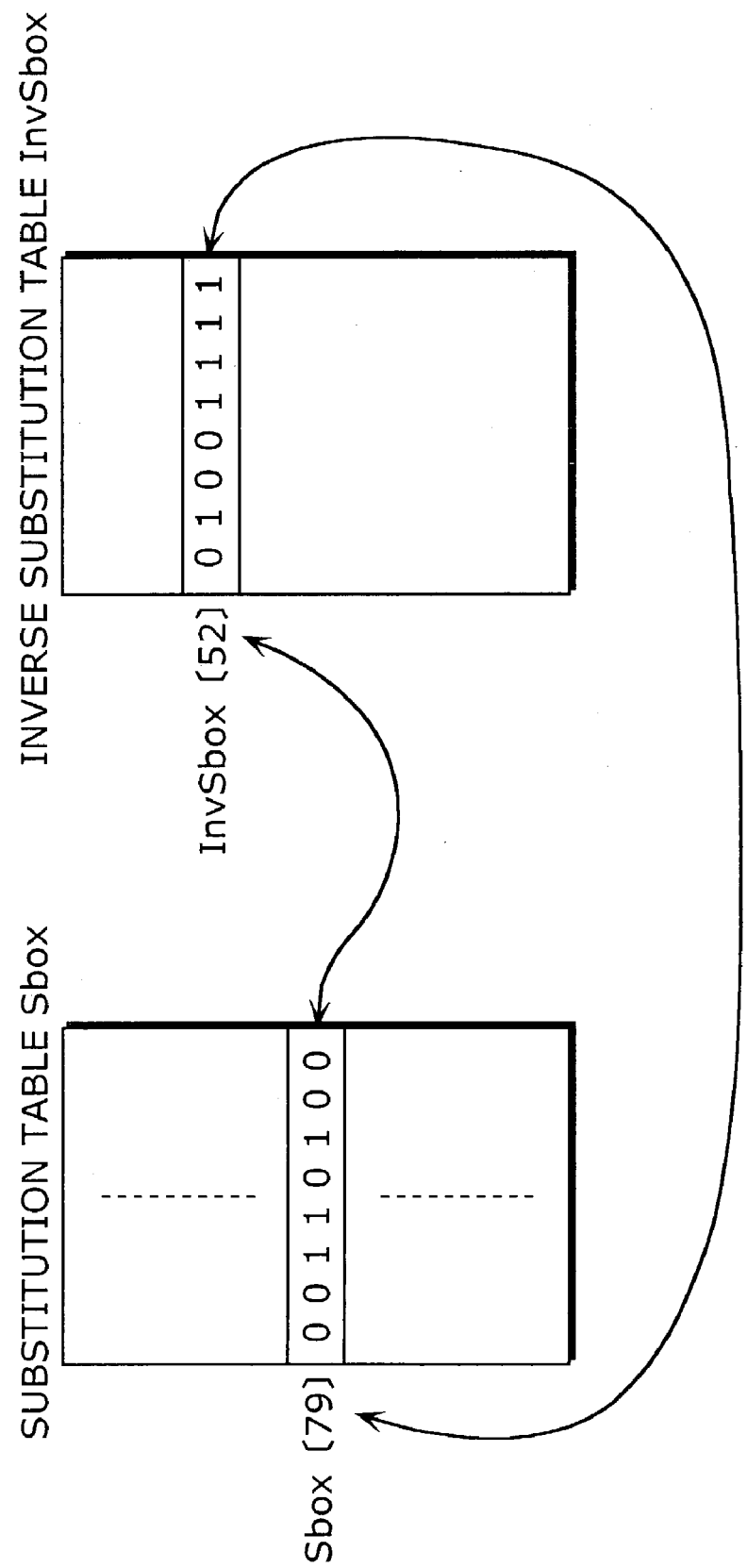
FIG. 11 is a diagram showing a concrete example which describes a relationship between the substitution table Sbox and the inverse substitution table InvSbox.
Figure 12:
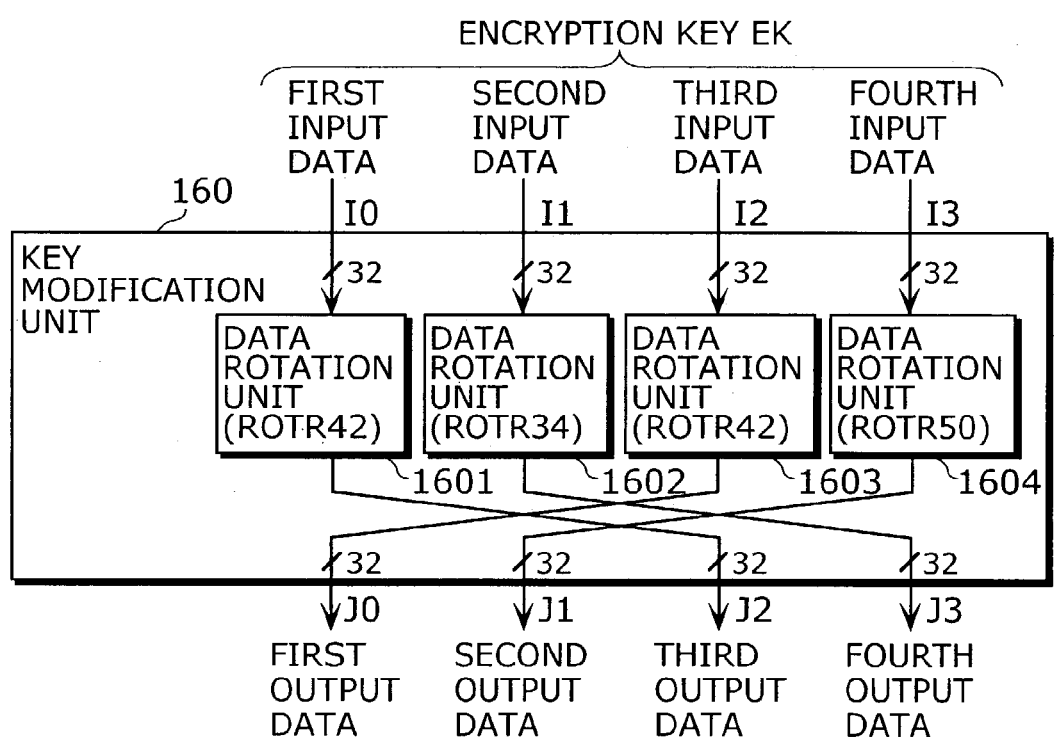
FIG. 12 is a block diagram demonstrating the sample structure of the key modification unit 160.

FIG. 11 is a diagram showing a concrete example describing the relationship between the substitution table Sbox and the inverse substitution table InvSbox. For example, suppose a value of Sbox [79] is "00110100" in a binary notation. "00110100" is "52" in a decimal notation. Also, "79" in decimal is "01001111" in the binary notation. Therefore, a value of InvSbox [52] is "01001111" in the binary notation.

Each of the data inverse substituting units 313~315 receives the respective data blocks A1~A3 from the data dividing unit 311, and gets the data blocks B1~B3 respectively, and outputs them. Since the process executed by each of the data inverse substituting units 313~315 is the same as the process done in the data inverse substituting unit 312, its detailed explanation is not repeated here.

The data concatenation unit 316 respectively receives the data blocks B0~B3 from the data inverse substituting units 312~315, concatenates the data blocks B0~B3 according to the following formula (30), gets the 64-bit data Z, and outputs it.

$$Z = B0\|B1\|B2\|B3 \quad (30)$$

ROTR9 (X2), ROTR13 (X3) and ROTR1 (X0) are obtained as the first~fourth output data Y0~Y3 respectively as indicated in Table 1.

If the first~fourth output data Y0~Y3 obtained in the key conversion unit 21 are supposed to be the first~fourth input data X0~X3 respectively in the key conversion unit 22, the same data rotation process is executed, and ROTR14 (X2), ROTR22 (X3), ROTR14 (X0) and ROTR6 (X1) are obtained as the first~fourth output data Y0~Y3 in the key conversion unit 22, which are as shown in Table 1.

If the same process is executed to the key conversion units 23~27, the result shown in Table 1 can be obtained. Therefore, if the key modification unit 40 having the structure shown in FIG. 8, the equivalent result to the one of the processes up to the key conversion units 21~27 can be obtained.

TABLE 1

| KEY CONVERSION UNIT | OUTPUT | | | |
|---|---|---|---|---|
| | FIRST OUTPUT DATA Y0 | SECOND OUPTUT DATA Y1 | THIRD OUTPUT DATA Y2 | FOURTH OUTPUT DATA Y3 |
| KEY CONVERSION UNIT 21 | ROTR5(X1) | ROTR9(X2) | ROTR13(X3) | ROTR1(X0) |
| KEY CONVERSION UNIT 22 | ROTR14(X2) | ROTR22(X3) | ROTR14(X0) | ROTR6(X1) |
| KEY CONVERSION UNIT 23 | ROTR27(X3) | ROTR23(X0) | ROTR19(X1) | ROTR15(X2) |
| KEY CONVERSION UNIT 24 | ROTR28(X0) | ROTR28(X1) | ROTR28(X2) | ROTR28(X3) |
| KEY CONVERSION UNIT 25 | ROTR33(X1) | ROTR37(X2) | ROTR41(X3) | ROTR29(X0) |
| KEY CONVERSION UNIT 26 | ROTR42(X2) | ROTR50(X3) | ROTR42(X0) | ROTR34(X1) |
| KEY CONVERSION UNIT 27 | ROTR55(X3) | ROTR51(X0) | ROTR47(X1) | ROTR43(X2) |

The following describes the key modification process executed by the key modification unit 40 in FIG. 8. The key modification unit 40 executes the process with an input of the 128-bit encryption key EK, and makes each 32 bits from its upper side of the encryption key EK be the first~fourth input data I0~I3.

Each of the data rotation units 401~404 calculates the second output data J1, the third output data J2, the fourth output data J3 and the first output data J0 respectively according to following formulas (31)~(34).

$$J1 = ROTR51(I0) \quad (31)$$

$$J2 = ROTR47(I1) \quad (32)$$

$$J3 = ROTR43(I2) \quad (33)$$

$$J0 = ROTR55(I3) \quad (34)$$

ROTR51 (I), ROTR47 (I), ROTR43 (I), and ROTR55 (I) here show results of the rotation bit shift that shifts the data I by 51 bits, 47 bits, 43 bits and 55 bits each in the lower direction (the right direction).

Finally, the key modification unit 40 outputs the first~fourth output data J0~J3.

The following describes a meaning of a shift volume in the data rotation unit 401 of the key modification unit 40. The data rotation process is executed in the output calculation unit 230 in FIG. 3 to the first~fourth input data X0~X3 input to the key conversion unit 21, and ROTR5 (X1), Although FIG. 8 shows an example of the key modification unit 40 having 7 stages of the key conversion units, it is possible to have a key modification unit regardless of a number of stages of the key conversion units. For example, when there are 6 stages of the key conversion units, the key modification unit 160 in FIG. 12 may be used in stead of the key modification unit 40. The key modification unit 160 is created based on Table 1. Each of the data rotation units 1601~1604 of the key modification unit 160 executes a rotation bit shift process by 42 bits, 34 bits, 42 bits and 50 bits respectively to the input data in a lower bit direction (a right direction). However, the rotation bit shift by 32 bits is equal to the rotation bit shift by 0 bit (i.e. no process takes place). Therefore, it is possible to reduce the number of the rotation bit shifts by setting the number of the rotation bit shifts to 10 bits, 2 bits, 10 bits and 18 bits respectively in the data rotation units 1601~1604.

Also, the number of the rotation bit shifts in the data rotation units 401~404 of the key modification unit 40 shown in FIG. 8 can be reduced to 19 bits, 15 bits, 11 bits and 23 bits respectively.

The following describes the key inverse conversion process executed by the key inverse conversion units 41~47 shown in FIG. 9. Each of the key inverse conversion units 41~47 executes the expansion key calculation process and the data conversion process, which are explained later, to the first~fourth input data Y0~Y3, calculates the expansion key SK and the first~fourth output data Z0~Z3, and outputs them. The first~fourth input data Y0~Y3 are the four 32-bit data blocks output from the key modification unit 40 or the preceding inverse conversion unit. The expansion key SK is one of SK7~SK1 input to the respective data inverse conversion units 31~37.

The following describes the expansion key calculation process executed in the expansion key calculation unit 410.

The exclusive-OR operation unit 411 executes an exclusive-OR operation per bit between the second input data Y1 and the fourth input data Y3 according to the following formula (35), and gets 32-bit data A.

$$A = Y1(+)Y3 \quad (35)$$

The data substituting unit 412 receives data A from the exclusive-OR operation unit 411, and gets 32-bit data B, which is in a relationship indicated in the following formula (36), using the same substitution table Sbox as the substitution table used in the data conversion units 11~18 at the time of encryption.

$$B = Sbox[A0] \| Sbox[A1] \| Sbox[A2] \| Sbox[A3] \quad (36)$$

The data is divided by each 8 bits from its upper level of the data A is supposed to be A0, A1, A2 and A3 each.

The exclusive-OR operation unit 413 receives the data B from the data substituting unit 412, executes the exclusive-OR operation per bit between the data B and the third input data Y2 according to the following formula (37), and gets 32-bit data C.

$$C = B(+)Y2 \quad (37)$$

The exclusive-OR operation unit 414 receives the data C from the exclusive-OR operation unit 413, executes the exclusive-OR operation per bit between the data C and the second input data Y1 according to the following formula (38), and gets 32-bit data D.

$$D = C(+)Y1 \quad (38)$$

The exclusive-OR operation unit 415 receives the data D from the exclusive-OR operation unit 414, executes the exclusive-OR operation per bit between the data D and the first input data Y0 according to the following formula (39), and gets 32-bit data E.

$$E = D(+)Y0 \quad (39)$$

The data concatenation unit 416 receives the data C and the data E respectively from the exclusive-OR operation units 413 and 415, concatenates the data C and the data E according to the following formula (40), and outputs it as 64 bit expansion key SK.

$$SK = C \| E \quad (40)$$

The following describes a process (a data conversion process) that calculates the first~fourth output data Z0~Z3 in the output inverse calculation unit 430.

The data rotation units 417~420 calculate the second output data Z1, the third output data Z2, the fourth output data Z3 and the first output data Z0 respectively according to the following formulas (41)~(44).

$$Z1 = ROTL5(Y0) \quad (41)$$

$$Z2 = ROTL9(Y1) \quad (42)$$

$$Z3 = ROTL13(Y2) \quad (43)$$

$$Z0 = ROTL1(Y3) \quad (44)$$

ROTL5 (Y), ROTL9 (Y), ROTL13 (Y) and ROTL1 (Y) here show results of the rotation bit shift by 5 bits, 9 bits, 13 bits and 1 bit each executed to the data Y in the upper bit direction (the left direction).

The following describes an effect of the encryption system in the embodiment explained above in comparison with conventional technologies.

Figure 17:
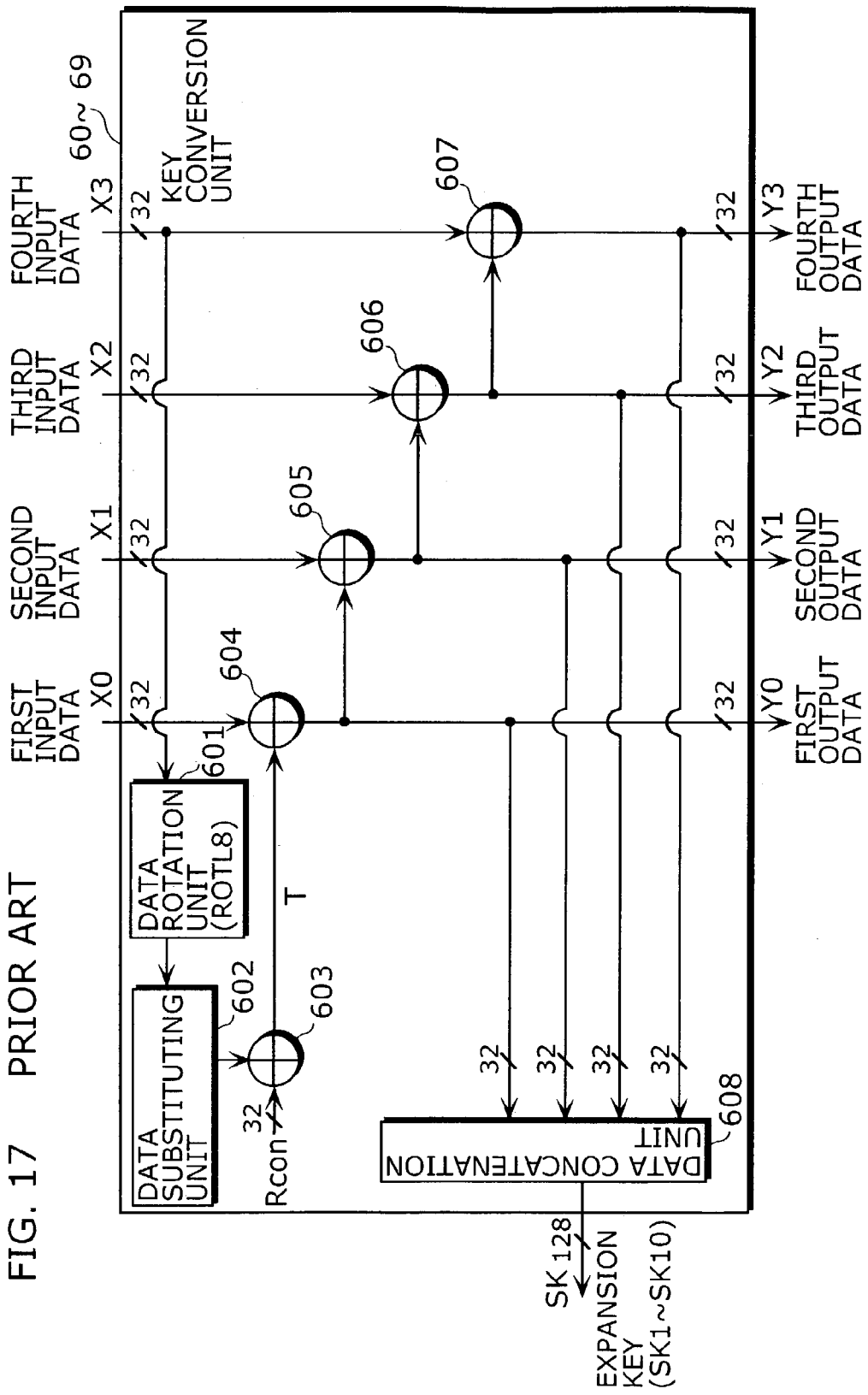
FIG. 17 is a block diagram showing the structure of the key conversion units 60~69 as related to the first related art.
Figure 18:
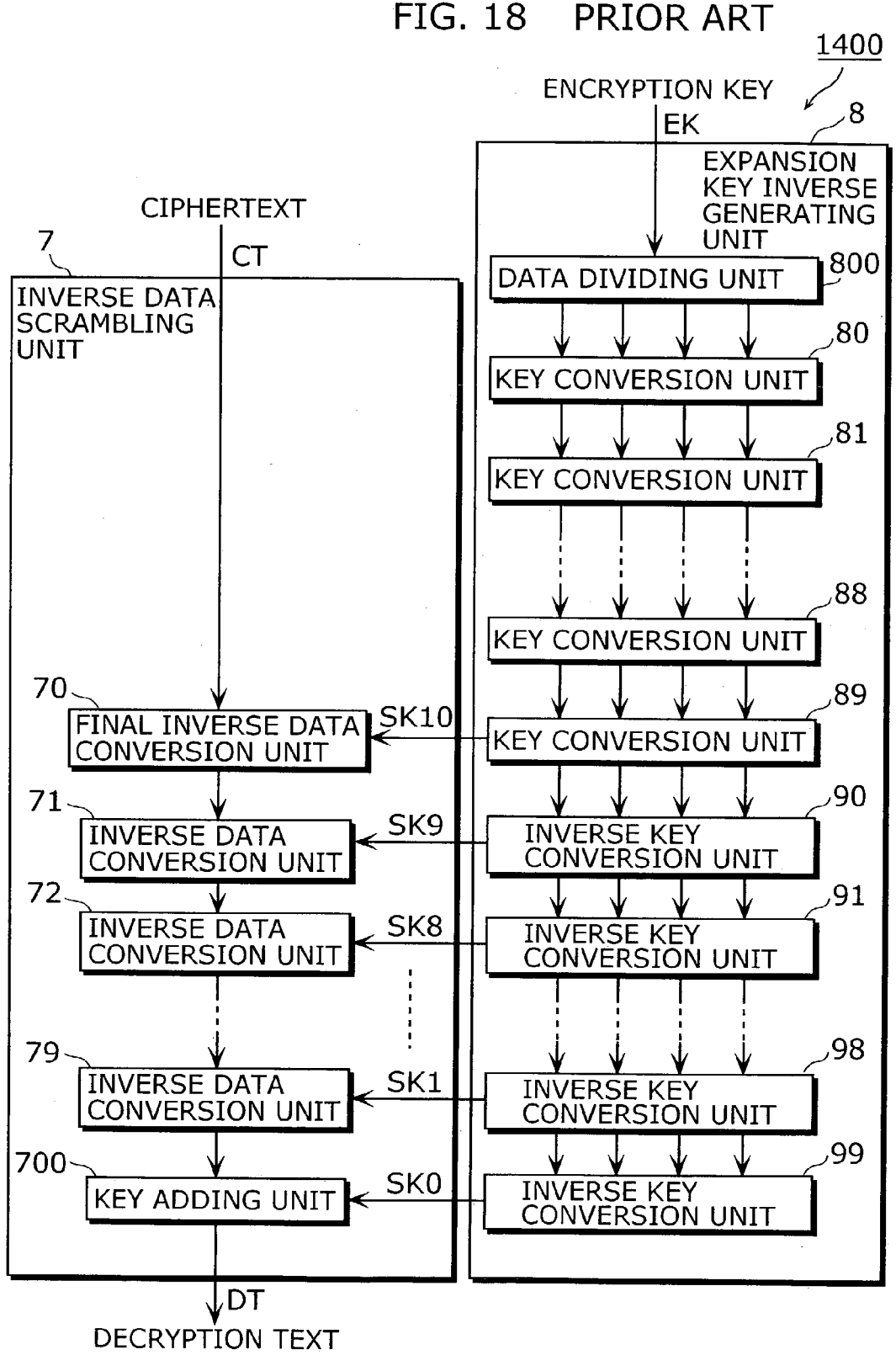
FIG. 18 is a block diagram showing the structure of the decryption device 1400 as related to the first related art.
Figure 19:
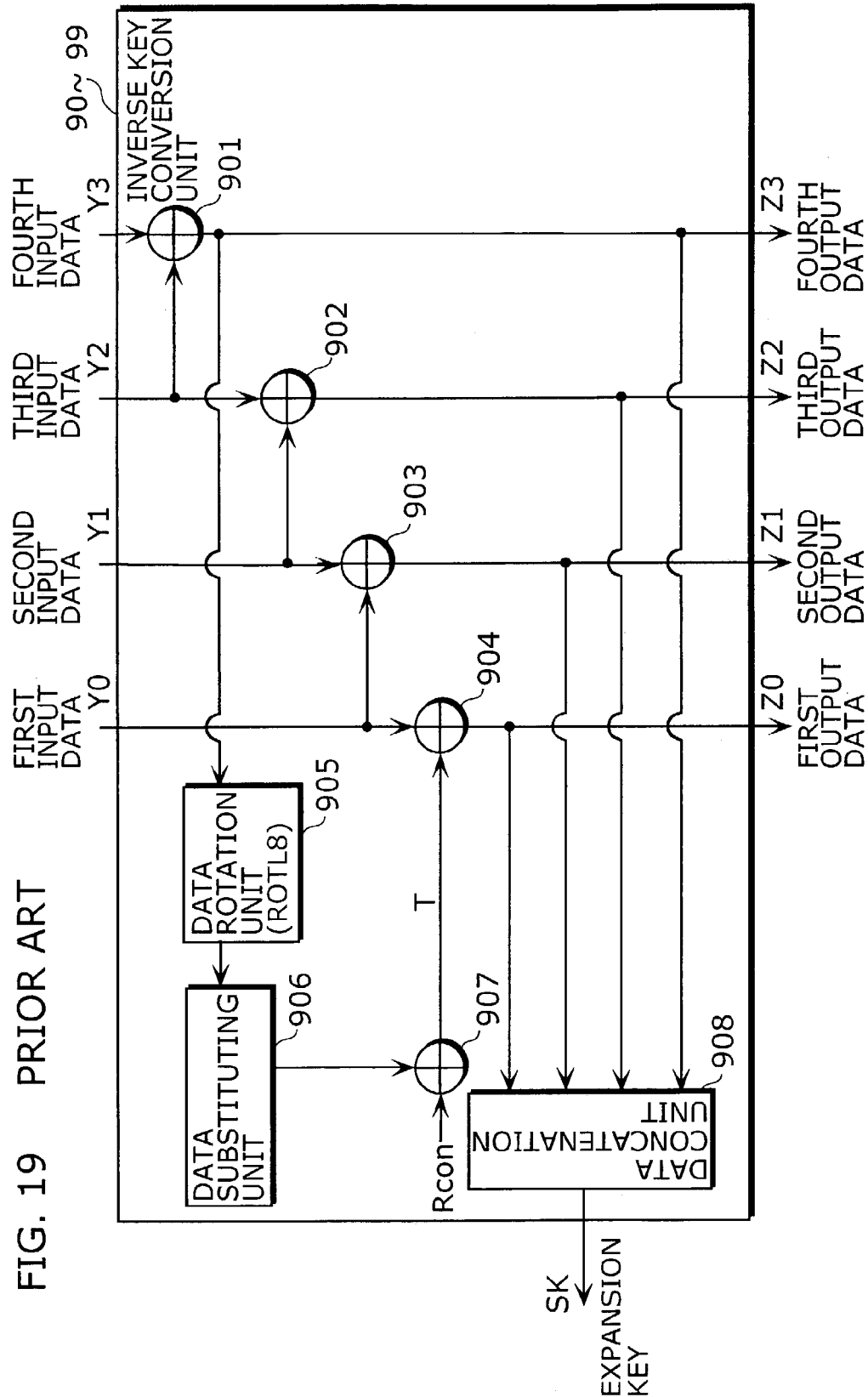
FIG. 19 is a block diagram showing the structure of the key inverse conversion units 90~99 as related to the first related art.
Figure 20:
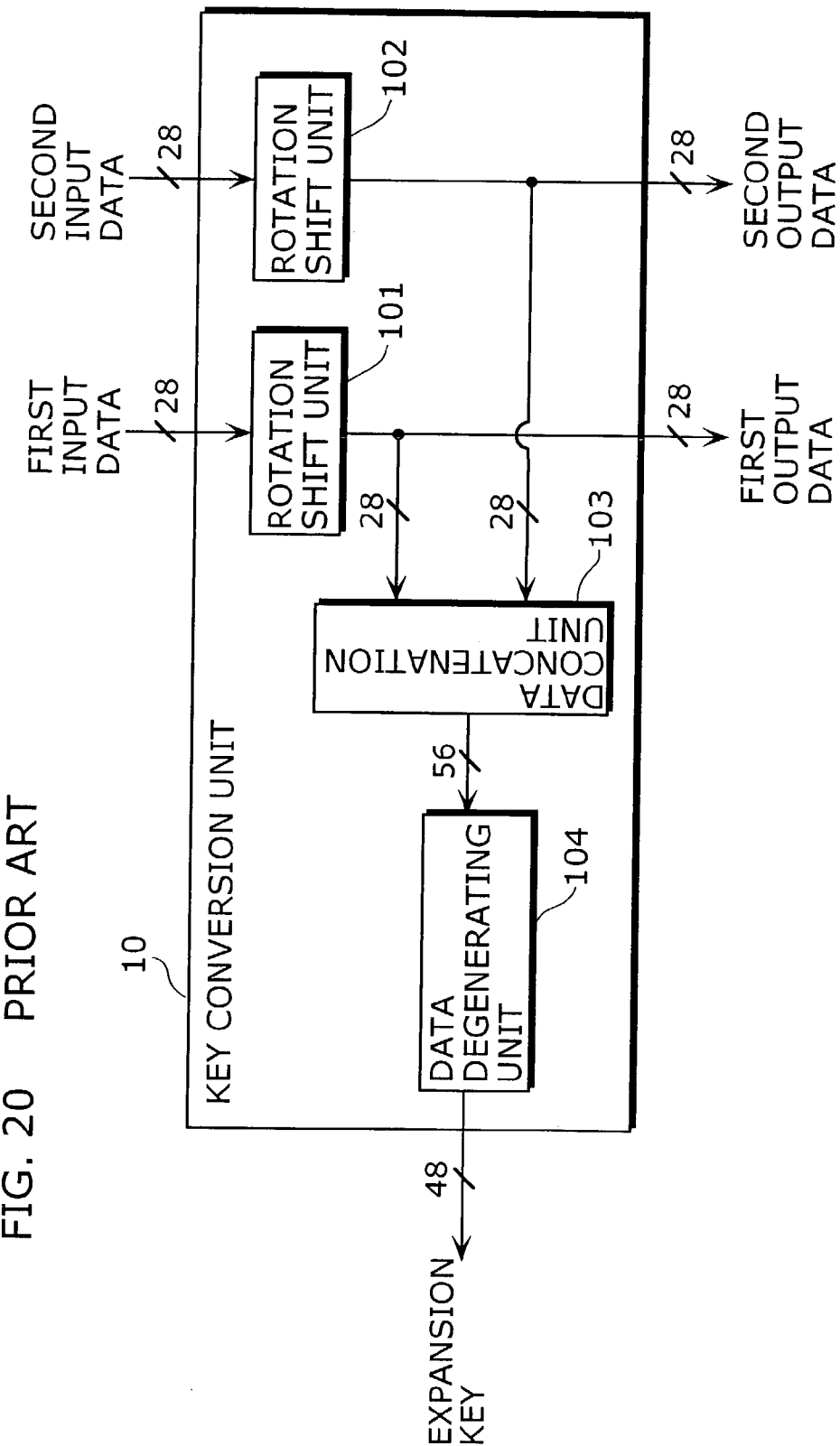
FIG. 20 is a block diagram showing the structure of the key conversion unit 10 as related to the second related art.
Figure 21:
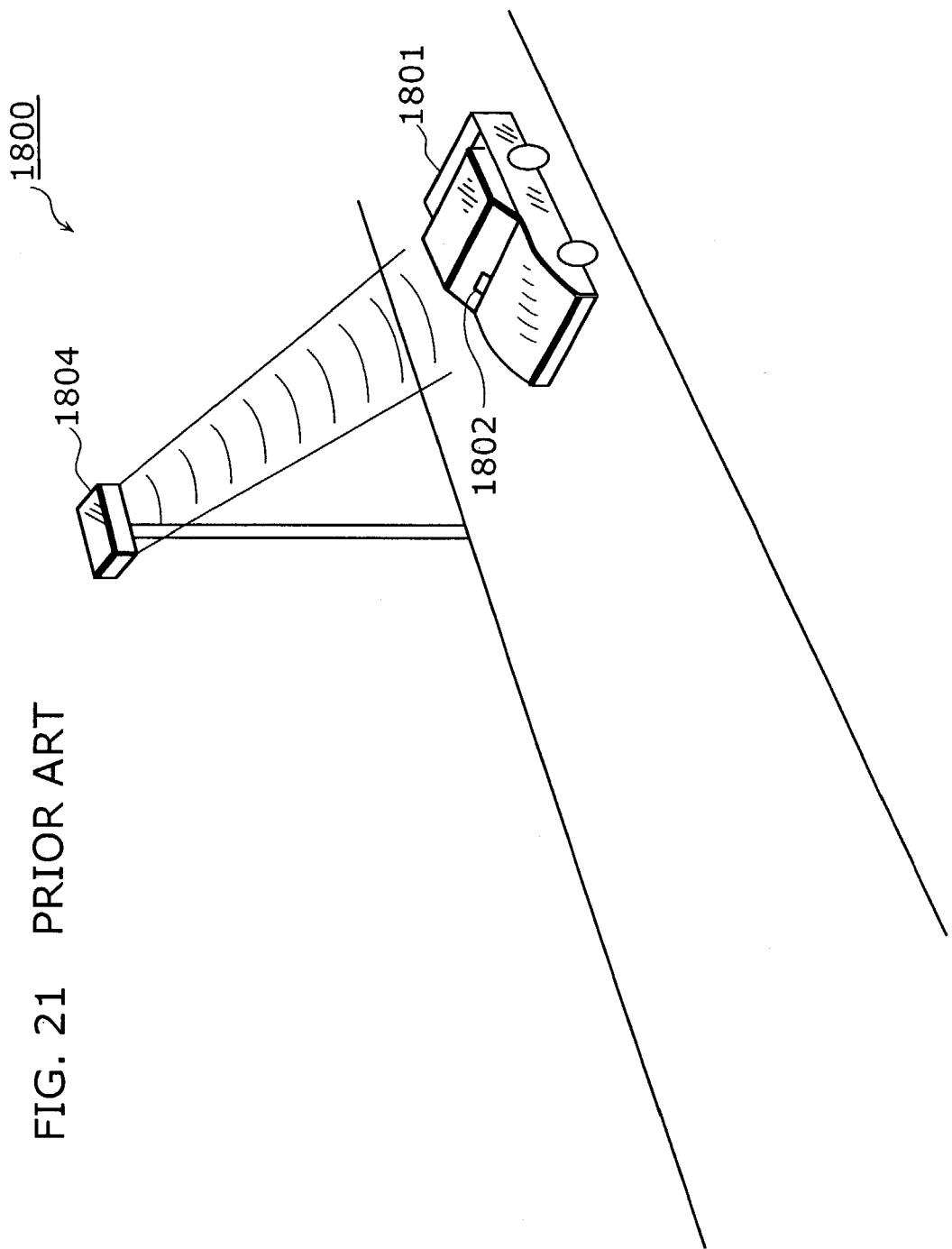
FIG. 21 is a diagram describing an Electronic Toll Collection (ETC) system.

As shown in FIG. 17, in the first related art, the process in the key conversion unit needs to be executed 9 times as an overhead to get the expansion key SK10 used in the final data inverse conversion unit 70 within the decryption device 1400. Because of this, the decryption process in the first related art requires a large amount of processing time when compared to the time taken for the encryption process.

However, as shown in FIG. 6, the process equivalent to the above overhead is only the process in the key modification unit 40 in the decryption device 1200 related to the present embodiment. This is equivalent to repeating the process in the output calculation unit 230 of the key conversion unit, shown in FIG. 3, 7 times. For a case of the data rotation process, the process to repeat the data rotation process of r bit(s) (r is an integer) 7 times is equivalent to the data rotation process of (7*r) bits once. By doing so, repeating the process of the output calculation unit 230 7 times is equivalent to executing the data rotation process 4 times, as shown in the key modification unit 40. A comparison of the overhead processing volume between the both cases is as follows.

In the first related art, to execute the process of the key conversion unit one time requires 5 times of the exclusive-OR operation, once of the substituting process and once of the data rotation process. Therefore, if this is executed 9 times, 45 times of the exclusive-OR operation, 9 times of the substitution process and 9 times of the data rotation process are required as the overhead. On the other hand, in the decryption device 1200 as related to the present embodiment, the process necessary as the overhead is 4 times of the data rotation process only.

That is to say, the overheads of the present invention are much less than the ones of the first related art. This is realized by separating the expansion key calculation unit 210, which calculates the expansion key, from the output calculation unit 230, which serves as input to the subsequent key conversion unit, in the key conversion unit indicated in FIG. 3, and constructing the output calculation unit 230 only with the data rotation process.

Also, since the data rotation process can be realized by arranging a distribution pattern of signal lines when it is installed in hardware, it does not cause data delay. Because of this, when the decryption device 1200 shown in FIG. 6 is realized in the hardware, the overhead can be substantially regarded as zero. Also, when the decryption device 1200 is realized in software, the rotation bit shift can be executed at high speed in most of processors. Therefore, it is possible to say that the overhead is so small that it can be ignored.

Next, the randomness of the expansion key generated in the system is examined. At the time of encryption, the output of the data substituting unit 212 in the key conversion units 21~27 shown in FIG. 3 has an impact on all of the expansion keys through the data combining process by the exclusive-OR operation units 213~215. That is to say, the non-linear process by using the substitution table of the data substituting unit 212 has an impact on an entire range of the expansion keys through the data combining process by the exclusive-OR operation units 213~215. It means to perform the same effect as the key conversion units 60~69 in the first related art. Also, all of the first~fourth input data X0~X3 are used as the input data in the data combining process executed by the exclusive-OR operation units 211 and 213~215. Therefore, even when only a bit of the encryption key EK is changed, it is possible to say that all of the expansion keys SK0~SK7 generated by it are changed. From the above, it is possible to say that the generated expansion key contains sufficient randomness.

Furthermore, each of the data rotation units 217~220 within the output calculation unit 230 uses 1, 5, 9 and 13 bits respectively as a number of times for its data rotation. These numbers of bit(s) are not a measure of the number of bits (32 bits) respectively input to the data rotation unit 217. Compared to this, in the second related art, the number of bits, i.e. 8 that is a measure of 32, is used as the number of bits for the data rotation in the bit rotation unit 601 indicated in FIG. 17. Because of this difference, there is an effect explained below in the data rotation unit of the present embodiment. For example, even if the data rotation of 8 bits is executed to 32-bit data of 33333333 in a hexadecimal notation, it is 33333333. There is no change by the data rotation. The same applied to data such as 11111111 and 55555555. However, in the present embodiment, the above case only happens to the data of FFFFFFFF and 00000000 in the hexadecimal notation in the data rotation of the number of bits, which is not a measure of 32. Any input data other than the above gets the output data different from its input data. That is to say, higher data scrambling performance is realized in the data rotation unit of the present embodiment. Because the data rotation unit having the number of rotations, which is not a measure of the number of bits of the input data, is used in the output calculation unit 230 within the key conversion units 21~27 in the present embodiment, a high data scrambling performance is realized even in the output calculation unit 230.

The data rotation process is executed to all of the 32-bit data blocks in the output calculation unit 230, but it is not limited to this structure. As long as the data rotation process is executed to at least one of the four data blocks, it is sufficient. Also, the number of data rotations is not limited to the values indicated in the present embodiment. As long as it is not a measure of the data block size, it may be other number of rotations.

Besides, rather than the data rotation process, the output calculation unit 230 may conduct a fixed conversion process to the first~fourth input data X0~X3 in a way each bit value of each of the input data does not interfere each other. For example, a bit replacing unit 1500 indicated in FIG. 13 may be used rather than the data rotation unit 217. The bit replacing unit 1500 receives the first input data X0 having 32 bits, replaces the bit positions to prevent each bit value from being interfered by the other, and outputs it as the fourth output data Y3.

Because each bit value does not interfere each other with such a conversion, it is possible to create the key modification unit such as the one indicated in FIG. 8.

Figure 14A:
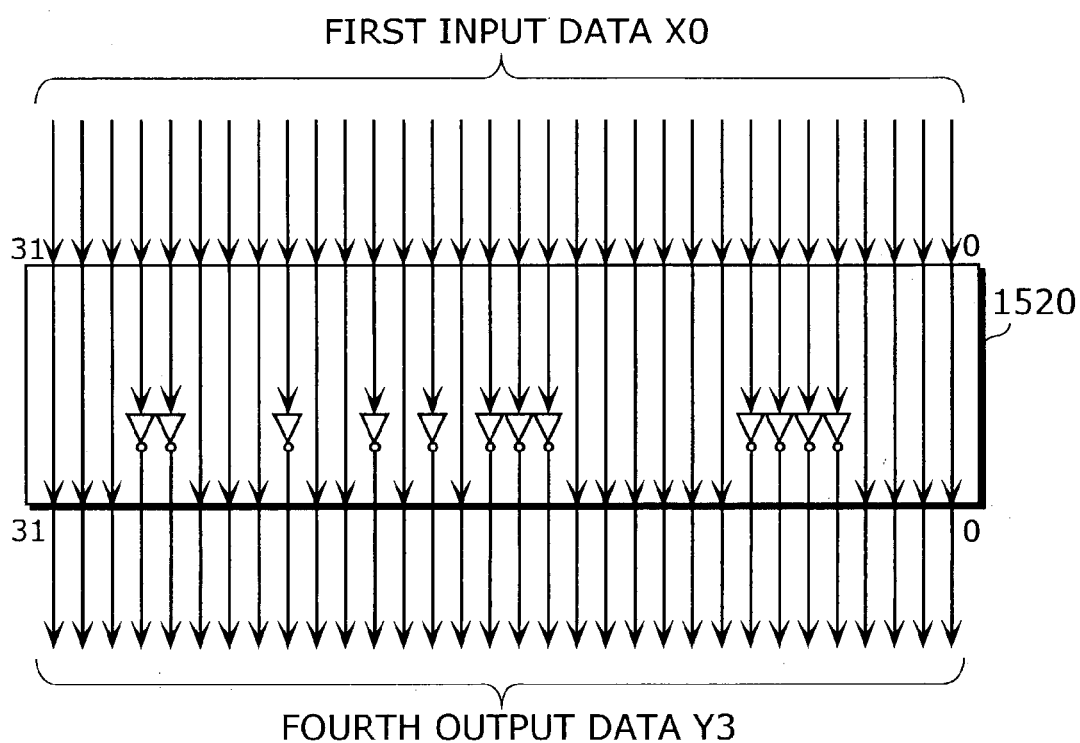
FIG. 14 is a diagram describing a bit reversing unit 1520 and an exclusive-OR operation unit 1540 equivalent to it.
Figure 14B:
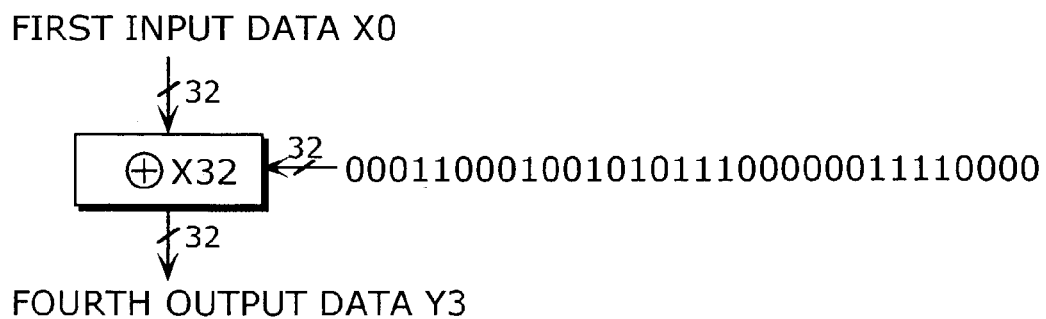

Also, the bit reversing unit 1520 may be used, which reverses only a specific bit value indicated in FIG. 14 A rather than the data rotation unit 217. The bit reversing unit 1520 indicated in FIG. 14 A is equivalent to the exclusive-OR operation unit 1540 shown in FIG. 14 B.

With such a conversion, it is possible to create the key modification unit indicated in FIG. 8, because each bit value does not interfere each other like the bit replacing unit 1500.

Also, though the present embodiment uses the structure shown in FIG. 2 as its data conversion unit, it is not limited to this structure.

Furthermore, the sizes of the plain text and the ciphertext are set to 64-bit, the size of the encryption key is 128-bit and the size of the expansion key is 64-bit in the present embodiment, but they are not limited to these data sizes. Also, the number of stages for the data conversion process in the data scrambling unit 1 indicated in FIG. 1 is set to 8 stages, but it is not limited to this number of stages.

In addition, though the exclusive-OR operation unit 211 of the key conversion unit indicated in FIG. 3 executes the exclusive-OR operation to two pieces of data out of four 32-bit data, it is not limited to this structure. As long as the exclusive-OR operation unit 211 has a configuration to execute the exclusive-OR operation to at least two of discretional part data obtained from 128 bits of concatenated first~fourth input data X0~X3, it can be any configuration.

Moreover, the exclusive-OR operation unit 213 executes the exclusive-OR operation between the data B substituted and converted by the data substituting unit 212 and one of the first~fourth input data X0~X3, it is not limited to this structure. The exclusive-OR operation unit 213 may have a configuration to execute the exclusive-OR operation between the data B and at least one of discretional part data obtained from the 128 bits of concatenated first~fourth input data X0~X3.

Additionally, the exclusive-OR operation units 211, 213~215 use the exclusive-OR operation as a method for combining data, but it can be any process as long as it is a process that calculates one output data from two or more input data such as addition, subtraction and multiplication.

Figure 15:
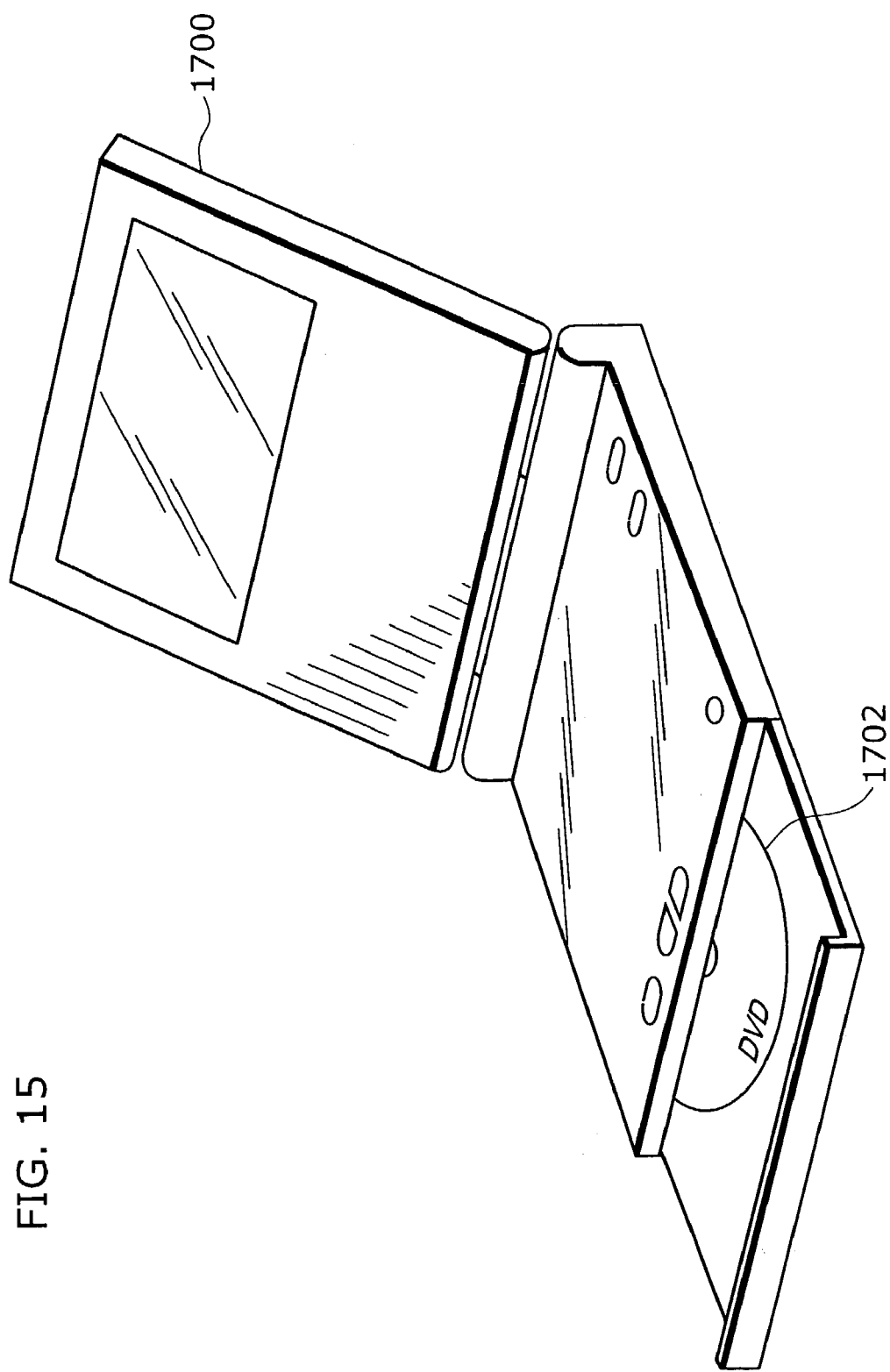
FIG. 15 is a diagram showing an external view of a Digital Versatile Disc (DVD) player used as a practical sample of the encryption system related to the embodiment.
Figure 16:
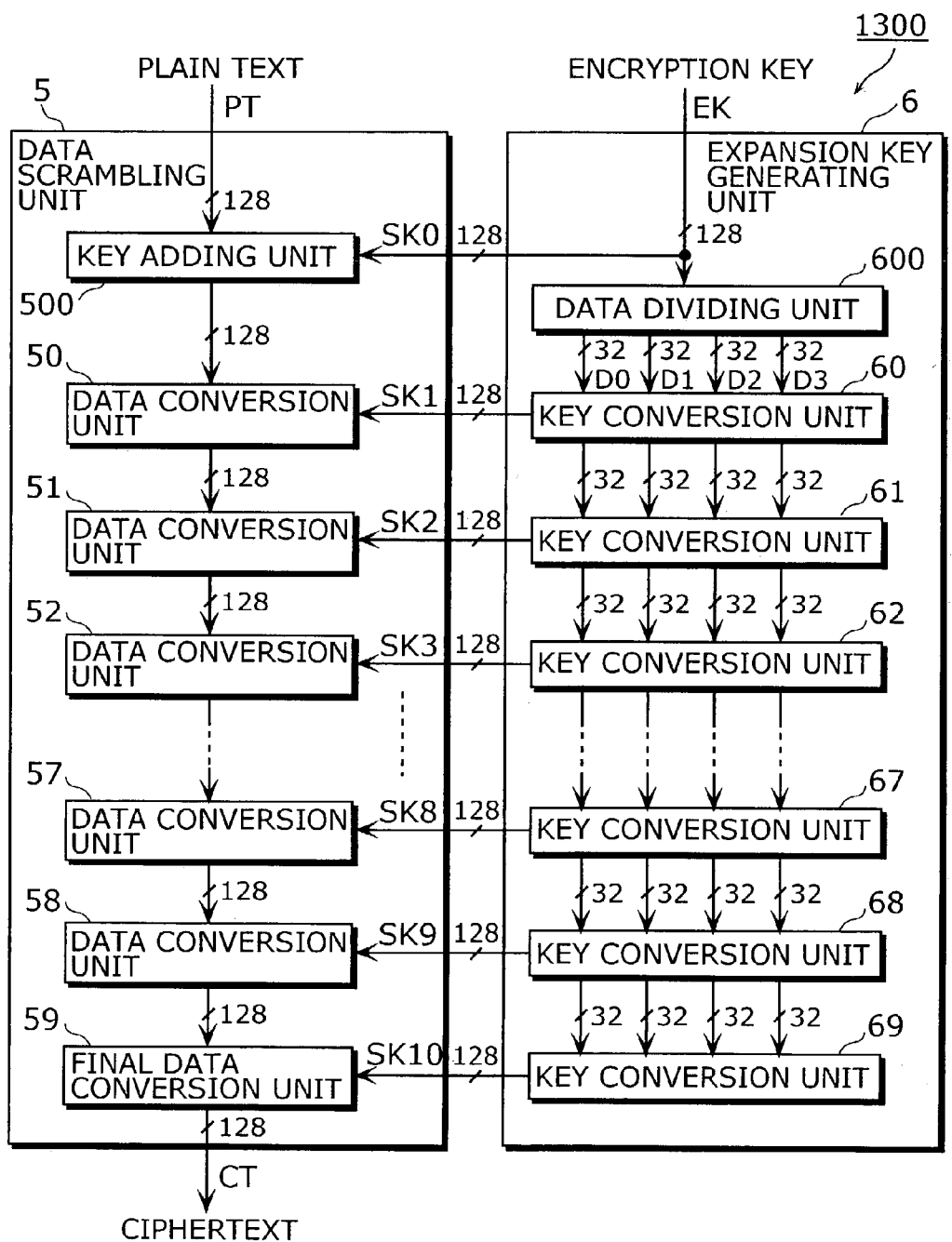
FIG. 16 is a block diagram showing the structure of the encryption device 1300 as related to the first related art.

FIG. 15 is an external view of a DVD player showing a practical use of the encryption system related to the present embodiment. The DVD player 1700 may contain the decryption device 1200 shown in FIG. 6 when it authenticates contents of an inserted DVD 1702. Because this authentication process can be executed at high speed, it can reduce time actually taken from insertion of the DVD 1702 to reproduction of contents of the DVD 1702.

As clarified from the above explanation, rather than using the method in the first related art in which the expansion key generating process and the process for getting an input for the subsequent expansion key generating process are executed by sharing a part of the same processing circuit, the processes in the encryption system related to the present invention are separated into the expansion key calculation unit and the output calculation unit, and executed.

The expansion key calculation unit combines plural data, and calculates an expansion key. The output calculation unit uses a data rotation process that can convert a process, which is repeated n times (n is a natural number), to a simple equivalent process. In this way, the overhead process at the time of decryption does not get so much bigger than the process at the time of encryption like the first related art. Therefore, it is possible that the time taken for the decryption process does not have so much difference from the time taken for the encryption process.

The expansion key calculation unit uses a complicated process of a non-linear substituting process combined with a data combining process through a substitution table, rather than a simple bit replacing process like the second related art. Accordingly, the non-linear process using the substitution table has an influence on all of the expansion keys. Further, besides when the encryption key is changed, it has a feature where all of the expansion keys generated are affected by the change. Therefore, the present invention can realize a highly random expansion key generating process.

As mentioned above, according to the encryption system related to the present invention, the issues of the first and the second related arts can be resolved.

According to the encryption system related to the present invention, it is possible to provide an encryption process, and an authentication process and the like, which are high speed and achieve a high security level. Therefore, practical value of the present invention is extremely high when used by a system or the like, where it is required to meet high standards in terms of execution speed and security level.

What is claimed is:

1. An expansion key generating device operable to receive encryption key data as an input and operable to output a plurality of expansion key data comprising:
   a data dividing unit operable to receive the encryption key data, operable to divide the encryption key data into a plurality of part key data, and operable to output the plurality of part key data; and
   a plurality of key conversion units connected in series, each operable to receive the plurality of part key data as an input, and operable to output the expansion key data, wherein each of the plurality of key conversion units includes:
   an output calculation unit operable to
      receive as a plurality of input data, either the plurality of part key data or a plurality of output data from a preceding key conversion unit as a plurality of input data;
      execute a fixed conversion process for each of the plurality of input data such that each bit value of each of the plurality of input data does not interfere with each other, wherein said output calculation unit is operable to execute a rotation shift operation to at least one of the plurality of input data, where the bits of at least one of the plurality of input data are shifted according to a specific number; and
      subsequently output a plurality of output data to a subsequent key conversion unit; and
   an expansion key calculation unit operable to receive and combine the plurality of input data, and operable to generate and output the expansion key data.

2. The expansion key generating device according to claim 1, wherein the specific number by which the rotation shift operation shifts the bits of the input data is not a measure of a number of bits of the input data.

3. The expansion key generating device according to claim 1, wherein said output calculation unit is operable to change a position of each of the plurality of input data according to a predefined rule, after the execution of the rotation shift operation, and operable to subsequently output the plurality of output data.

4. The expansion key generating device according to claim 1, wherein, during the process of combining the plurality of input data, said expansion key calculation unit is operable to execute a substitution process to at least one of the plurality of input data according to a specific substitution table.

5. An expansion key generating device operable to receive encryption key data as an input and operable to output a plurality of expansion key data comprising:
   a data dividing unit operable to receive the encryption key data, operable to divide the encryption key data into a plurality of part key data, and operable to output the plurality of part key data; and
   a plurality of key conversion units connected in series, each operable to receive the plurality of part key data as an input, and operable to output the expansion key data, wherein each of the plurality of key conversion units includes:
   an output calculation unit operable to:
      receive as a plurality of input data, either the plurality of part key data or a plurality of output data from a preceding key conversion unit as a plurality of input data;
      execute a fixed conversion process for each of the plurality of input data, such that each bit value of each of the plurality of input data does not interfere with each other; and
      subsequently output a plurality of output data to a subsequent key conversion unit; and
   an expansion key calculation unit operable to:
      receive the plurality of input data;
      substitute at least one of the plurality of input data according to a specific substitution table;
      combine the plurality of input data; and
      generate and output the expansion key data,
   wherein said expansion key calculation unit includes:
      a first combining unit operable to combine at least two of the input data from the plurality of input data, and generate a first combined data;
      a data substituting unit operable to execute a substitution process to the first combined data according to the specific substitution table, and operable to output substituted data;
      a second combining unit operable to combine the substituted data and at least one of the input data from the plurality of input data, and operable to generate a second combined data; and
      an expansion key generating unit operable to receive as a data input at least said second combined data, and operable to generate the expansion key data.

6. An expansion key generating device operable to receive encryption key data as an input and operable to output a plurality of expansion key data comprising:
   a data dividing unit operable to receive the encryption key data, operable to divide the encryption key data into a plurality of part key data, and operable to output the plurality of part key data; and
   a plurality of key conversion units connected in series, each operable to receive the plurality of part key data as an input, and operable to output the expansion key data, wherein each of the plurality of key conversion units includes:
   an output calculation unit operable to:
      receive as a plurality of input data, either the plurality of part key data or a plurality of output data from a preceding key conversion unit as a plurality of input data;
      execute a fixed conversion process for each of the plurality of input data, such that each bit value of each of the plurality of input data does not interfere with each other;
      subsequently output a plurality of output data to a subsequent key conversion unit; and
   an expansion key calculation unit operable to:
      receive the plurality of input data;
      substitute at least one of the plurality of input data according to a specific substitution table;
      combine the plurality of input data;
      concatenate the result of the substitution process and the result of combining the plurality of input data; and
      generate and output the expansion key data according to the concatenation result.

7. An encryption device operable to encrypt plain text data using encryption key data comprising:
- an expansion key generating device operable to receive encryption key data as an input, and operable to output a plurality of expansion key data; and
- a data scrambling device operable to encrypt the plain text according to the plurality of expansion key data output by said expansion key generating device, and operable generate and output ciphertext data;
- wherein said expansion key generating device includes:
  - a data dividing unit operable to divide the encryption key data into a plurality of part key data, and operable to output the plurality of part key data; and
  - a plurality of key conversion units connected in series, each operable to receive the plurality of part key data as an input, and operable to output the expansion key data, wherein each of said plurality of key conversion units includes:
    - an output calculation unit operable to:
      - receive as a plurality of input data either the plurality of part key data or a plurality of output data from a preceding key conversion unit;
      - execute a fixed conversion process for each of the plurality of input data such that each bit value of each of the plurality of input data does not interfere with each other, wherein said output calculation unit is operable to execute a rotation shift operation to at least one of the plurality of input data, where the bits of at least one of the plurality of input data are shifted according to a specific number; and
      - subsequently output a plurality of output data to a subsequent key conversion unit; and
    - an expansion key calculation unit operable to receive and combine the plurality of input data, and operable to generate and output the expansion key data.

8. The encryption device according to claim 7, wherein the specific number by which the rotation shift operation shifts the bits of the input date is not a measure of a number of bits of the input data.

9. A decryption device operable to decrypt ciphertext data using encryption key data comprising:
- an inverse expansion key generating device operable to receive encryption key data as an input, and operable to output a plurality of expansion key data in the reverse order of an expansion key generating device; and
- an inverse data scrambling device operable to decrypt the ciphertext data according to the plurality of expansion key data output by said inverse expansion key generating device, and operable to generate and output decryption text;
- wherein said inverse expansion key generating device includes:
  - a key modification unit operable receive the encryption key data, operable to divide the encryption key data into a plurality of part key data, operable to arrange the position of each of the plurality of part key data according to a predefined rule, and operable to subsequently output the plurality of part key data; and
  - a plurality of inverse key conversion units connected in series, each operable to receive as a plurality of input data either the plurality of part key data output from said key modification unit or a plurality of output data from a preceding inverse key conversion unit, operable to generate the expansion key data in a reverse order of the expansion key generating device, and operable to output data to a subsequent inverse key conversion unit, wherein each of said plurality of inverse key conversion units includes:
    - an output calculation unit operable to:
      - receive the plurality of input data received by said inverse key conversion unit;
      - execute a fixed conversion process for each of the plurality of input data such that each bit value of each of the plurality of input data does not interfere with each other, wherein said output calculation unit is operable to execute a rotation shift operation to at least one of the plurality of input data, where the bits of at least one of the plurality of input data are shifted according to a specific number; and
      - subsequently output a plurality of output data to a subsequent inverse key conversion unit; and
    - an expansion key calculation unit operable to receive and combine the plurality of input data, and operable to generate and output the expansion key data.

10. The decryption device according to claim 9, wherein the specific number by which the rotation shift operation shifts the bits of the input data is not a measure of a number of bits of the input data.

* * * * *

UNITED STATES PATENT AND TRADEMARK OFFICE
CERTIFICATE OF CORRECTION

PATENT NO. : 7,212,633 B2  
APPLICATION NO. : 10/400440  
DATED : May 1, 2007  
INVENTOR(S) : Kaoru Yokota et al.

Page 1 of 1

It is certified that error appears in the above-identified patent and that said Letters Patent is hereby corrected as shown below:

Column 25, line 18, "operable to" should read --operable to:--.

Column 26, line 52, "each other;" should read --each other; and--.

Signed and Sealed this

Seventh Day of August, 2007

JON W. DUDAS  
*Director of the United States Patent and Trademark Office*